United States Patent [19]

Huttenlocher et al.

[11] Patent Number: 5,416,851

[45] Date of Patent: May 16, 1995

[54] IMAGE ANALYSIS BASED ON LOCATION SAMPLING

[75] Inventors: Daniel P. Huttenlocher; Peter C. Wayner, both of Ithaca, N.Y.

[73] Assignee: Xerox Corporation, Stamford, Conn.

[21] Appl. No.: 737,956

[22] Filed: Jul. 30, 1991

[51] Int. Cl.⁶ .......................... G06K 9/20; G06K 9/48
[52] U.S. Cl. ................................. 382/196; 382/199
[58] Field of Search .................... 382/18, 20, 9, 21, 22, 382/39, 68

[56] References Cited

U.S. PATENT DOCUMENTS

| | | | |
|---|---|---|---|
| 2,838,602 | 6/1958 | Sprick | 382/18 |
| 3,297,989 | 1/1967 | Atchley et al. | 382/28 |
| 3,845,466 | 10/1974 | Hong | 382/39 |
| 4,061,998 | 12/1977 | Ito | 382/20 |
| 4,723,297 | 2/1988 | Postl | 382/46 |
| 4,747,150 | 5/1988 | Knutsson et al. | 382/21 |
| 4,747,151 | 5/1988 | Knutsson et al. | 382/21 |
| 4,747,152 | 5/1988 | Knutsson et al. | 382/21 |
| 4,783,826 | 11/1988 | Koso | 382/8 |
| 4,817,186 | 3/1989 | Goolsbey et al. | 382/9 |
| 5,001,766 | 3/1991 | Baird | 382/46 |
| 5,245,674 | 9/1993 | Cass et al. | 382/16 |
| 5,253,307 | 10/1993 | Wayner et al. | 382/22 |

FOREIGN PATENT DOCUMENTS

| | | | |
|---|---|---|---|
| 176910A1 | 4/1986 | European Pat. Off. | G06K 9/32 |
| 354701A3 | 2/1990 | European Pat. Off. | G06K 9/50 |
| 431961A2 | 6/1991 | European Pat. Off. | G06F 15/62 |

OTHER PUBLICATIONS

Fischler et al., Random Sample Consensus: A Paradigm for Model Fitting with Applications to Image Analysis and Automated Cartography, Graphics and Image Processing, Communications of the ACM, 24:6, Jun. 1981, pp. 381–395.

Primary Examiner—Joseph Mancuso
Assistant Examiner—David Fox

[57] ABSTRACT

An image is analyzed by random or pseudorandom sampling. Information about attributes such as skew, typeface, and character size and spacing is obtained by measuring a characteristic at a number of sampled locations and combining the results to obtain a measure of the characteristic for the image. The number of sampled locations is smaller than the number of locations in the image, but is large enough to achieve a degree of statistical significance. The sampled locations can be selected by obtaining a random or pseudorandom number indicating a candidate location and then applying a criterion to determine whether the candidate location is an appropriate starting point for the measurement. For example, the criterion can be that the location must be a pixel within a character or must be a pixel of a given color at an edge. The measurement can indicate a distance from each sampled location in each of a number of directions, such as the distance to an edge. The distances can be combined to obtain data indicating a distribution, such as by averaging. An image can be divided into segments, each of which has a prominent value for a characteristic being measured, by first dividing the image into starting segments, then sampling the starting segments to measure the characteristic, and then grouping the starting segments into larger segments based on the measurements. The starting segments can be rectangles or, for an image with words, can be segments that each include a word or a paragraph.

25 Claims, 15 Drawing Sheets

IMAGE ANALYSIS BASED ON LOCATION SAMPLING

BACKGROUND OF THE INVENTION

The present invention relates to techniques for analyzing an image.

Fischler, M. A. and Bolles, R. C., "Random Sample Consensus: A Paradigm for Model Fitting with Applications to Image Analysis and Automated Cartography," *Communications of the ACM,* the ACM. Vol. 24, No. 6. June 1981, pp. 381–395, describe a paradigm for fitting a model to experimental data. The paradigm, Random Sample Consensus/RANSAC), uses as small an initial data set as feasible and enlarges this set with consistent data when possible. Section IVA describes the RANSAC/LD algorithm, including a step of selecting 6-tuples from a list of 6-tuples by a quasirandom method that ensures a reasonable spatial distribution for the corresponding control points. RANSAC is applicable to image analysis and automated cartography, and its application to the location determination problem is described in detail in the article.

SUMMARY OF THE INVENTION

The present invention provides an image processing technique that measures a characteristic of an image by randomly or pseudorandomly sampling data defining the image. Instead of measuring the image characteristic relative to all image locations, the technique measures the image characteristic relative to a randomly or pseudorandomly selected subset of the image locations. The results are combined to obtain data measuring the image characteristic for the image.

One aspect of the invention deals with a basic problem in analyzing an image. Conventional image analysis techniques divide an image into pixels and operate on data defining every pixel of the image. But a typical image includes a very large number of pixels, so that this approach is computationally expensive.

This aspect is further based on the discovery of a technique that alleviates this problem. The technique randomly or pseudorandomly samples a number of locations in an image or a segment of an image, the sampled locations being referred to herein as a "sample set." Therefore, the technique can measure a characteristic for an image as a whole without operating on data defining every location of the image.

Random selection avoids aliasing that might result from non-random selection. For example, if locations are selected in a regular or uniform pattern, a regularly or uniformly occurring feature in an image may be ignored or misinterpreted if it occurs in a pattern such that none of its occurrences is at a location in the sample set or such that it occurs at all locations in the sample set but not at other locations.

The random sampling technique can be implemented by randomly or pseudorandomly producing a number indicating a location in the image and then measuring a characteristic for the indicated location. Then another number can be produced and the characteristic can be measured for another location, and so forth. The measurements for the sampled locations can be combined to obtain a measurement of the characteristic for the image.

The measurement for each location can be made with an operation that produces sample result data measuring the characteristic at the location. The sample result data for each location is a set of one or more data items providing information relative to the location, herein called a "result set." For example, the result set could include a data item for each of a number of directions extending from the location, with each direction's data item being a value indicating the distance in that direction to the nearest location at which the image meets a criterion.

The sample result data of the locations in the sample set can be combined to obtain combined result data for the image. For example, if result sets are obtained as described above, with each result set including a data item for each of a number of directions and with each direction's data item indicating distance in the direction, then a combined data item can be obtained for each direction by averaging the direction's data items.

The minimum number of locations necessary to accurately measure an image characteristic for an image depends on the characteristic, on the number of locations in the image, and on the desired degree of statistical significance. For example, 1000 samples are sufficient in measuring distance as a function of direction to obtain information about skew or font and 5000 are sufficient in measuring horizontal and vertical distances across and between connected components to obtain information about character and stroke sizes and spacings. On the other hand, 24 samples are sufficient in measuring variance of numbers of pixels of a given color along lines in a given direction to obtain information about skew.

A sufficient number of locations to measure a specific characteristic of an image to a desired degree of statistical significance can be determined by applying statistical sampling theory. For example, if the variance is known or can be estimated, statistical sampling theory can be rigorously applied to determine the number of samples required, with more samples being required if the variance is higher.

In other cases, statistical sampling theory can be heuristically applied by making more than one measurement, each measurement sampling a given number of locations. Of the number of locations is large enough, the results from the different measurements should be approximately the same. The specific numbers of samples set forth above were obtained by heuristically applying statistical sampling theory in this manner.

The technique described above leads to another problem, however, because often the information about features of interest is not evenly distributed throughout the image so that random selection is likely to select many pixels that provide little additional information and may instead provide noise. For example, information about features of text in an image is concentrated in areas that contain characters, and information about features of a line drawing is concentrated along the lines and at their intersections. Therefore, measurement of an image characteristic relative to a location in the middle of a large blank area of the image provides little useful information.

A more complete solution to the problem of selecting locations results from the discovery of a group of image characteristics that are highly informative if measured relative to locations that meet a criterion. Some of these image characteristics can be measured by measuring distances from starting locations that meet a first criterion to the nearest locations that meet a second criterion. Others can be measured by making measurements other than distance in relation to locations that meet a first criterion. In either case, locations in the sample set can be selected using the first criterion, herein also referred to as the "sample set criterion." Data indicating a candidate location can be obtained, such as by randomly or pseudorandomly producing a number, and then the sample set criterion can be applied to determine whether to obtain sample result data for the candidate location.

In an image that includes text, for example, the sample set criterion can be based on the color of a pixel or on whether a pixel has a neighboring pixel of another color. If the image includes black characters on a white background, a sample set criterion that selects only black pixels will select pixels in characters. A sample set criterion that selects a pixel only if it has a first color and has a neighbor of a second color will select edge pixels.

One image characteristic that is highly informative if measured relative to locations that meet a criterion is the profile of distances from an edge pixel across white pixels to the nearest edge pixel in each of a large number of directions. The sample set criterion in this case is either a white edge pixel or a black edge pixel. This profile is highly informative about skew. Images that include lines, such as lines of text, parallel lines, or rectangles, can often be usefully characterized by the skew of the lines. When results are combined at each direction to produce a combined profile for the image, minima occur at two directions separated by 180 degrees, which are directions approximately parallel to the lines of text. These minima occur because characters are typically closer to each neighboring character in the same line of text than to any character in neighboring lines of text.

Another such image characteristic that is highly informative about skew in an image of text is the total number of black pixels in each of a set of lines extending through a black pixel: the lines extend in several directions that cover a range that includes the actual skew. The sample set criterion in this case is a black pixel. The variances of the total numbers of black pixels in each direction are highly informative about skew, because directions parallel to lines of text have many black pixels if they intersect the centers of the characters but have very few black pixels if they are between lines, intersecting at most a few ascenders and descenders. Therefore, if the numbers of black pixels in each direction are combined by taking a sum of squares, the sum of squares is greatest at the direction of the lines of text. This variance measure can provide a more precise indication of skew than the profile described above. Therefore, a profile can be used to obtain a first approximation of skew before using variance to obtain a more precise approximation of skew. The first approximation is used to obtain the range of directions for the more precise approximation.

Another such image characteristic is the profile of distances from a black starting pixel across other black pixels to the nearest white or black edge pixel in each of a large number of directions. The sample set criterion in this case is a black pixel. This profile is highly informative about the typeface of characters in an image. The distances in each direction can be combined to produce a combined profile. The combined profile can be compared with profiles obtained for model images of typefaces to find the best match, thus recognizing typeface.

To facilitate comparison, the effect of skew should be taken into account in obtaining profiles.

Another such image characteristic, applicable to an image in which text skew is known, is the distribution of distances between edges of connected components in specific directions. Directions parallel and perpendicular to lines of text can be used. Separate distributions can be obtained in each direction for distances across connected components and for distances between connected components. The distributions of distances across connected components are informative about character and stroke sizes, while distributions of distances between connected components are informative about spacings between characters or strokes. Distances measured in each direction can be histogrammed or otherwise combined to obtain a distribution of distances for the image.

The above examples illustrate only a few of the many possible image characteristics that can be measured by applying an appropriate sample set criterion. In general, to obtain information about the shape or structure of connected components, the sample set criterion can be a pixel in a connected component; in this case, if the image has black connected components on a white background, the sample set criterion is a black pixel, and if the image has white connected components on a black background, the sample set criterion is a white pixel. To obtain information about edges, such as the distance between connected components, the sample set criterion can be a white edge pixel or a black edge pixel. If the image is defined by gray-scale data, the sample set criterion can be applied to a binarized form of the image.

This aspect of the invention can be implemented in a serial machine by first producing data indicating a candidate location in the image and by then applying the sample set criterion to determine whether to obtain sample result data for the candidate location. As noted above, the candidate location can be indicated by one or more randomly or pseudorandomly produced numbers.

Alternatively, this aspect can be implemented in a parallel machine in which each of a set of processing units has the respective data item of one or more locations stored in its local memory. The processing units can be operated to produce data indicating, for each location, whether it meets the sample set criterion. The locations in the sample set can then be selected from the locations that meet the criterion, by randomly or pseudorandomly producing candidate location data indicating candidate locations. The processing units can be operated to obtain sample result data in parallel either before or after the locations in the sample set are selected.

Another aspect of the invention is based on the recognition that images often include distinct parts with different prominent values for a characteristic such that an accurate measurement of the characteristic cannot be made for an entire image at once. For example, an image of text may include different parts that have different dominant typefaces, so that a measurement made by sampling across the entire image may not identify any of the dominant typefaces accurately.

This aspect is further based on the discovery of a technique that solves the problem of distinct parts by dividing the image into segments, each of which is itself an image for which an accurate measurement of the characteristic can be made. This solution can be implemented by initially dividing the image into starting segments, then sampling the starting segments to obtain information indicating which starting segments can be grouped to form larger segments. The larger segments can then be sampled and, if appropriate, grouped to form yet larger segments. When segments are formed that cannot be further grouped, the image characteristic can be measured for each of the segments.

The initial division of the image can be a tiling of the image into rectangles or other similarly shaped segments. On the other hand, if the image includes text, it can be initially divided into lines based on interline and interparagraph spaces, and, if appropriate, each line can be divided into words based on interword spaces. In recognizing typeface, for example, division into words may be appropriate because isolated words may be in a different typeface. But in measuring interline or interword spaces, division into words may not be appropriate. In measuring skew, division into lines would be inappropriate; on the other hand, the measurement of skew could be done before dividing into lines and words so that skew can be taken into account in obtaining segments.

The image characteristic measured to determine which segments can be grouped to form larger segments can be the same image characteristic measured for the larger segments being formed. If the differences between neighboring segments are sufficiently small, they can be grouped. More than one grouping can be tried to determine which produces the best results for each segment.

The following description, the drawings, and the claims further set forth these and other aspects, objects, features, and advantages of the invention.

DETAILED DESCRIPTION

A. Conceptual Framework

Figure 1:
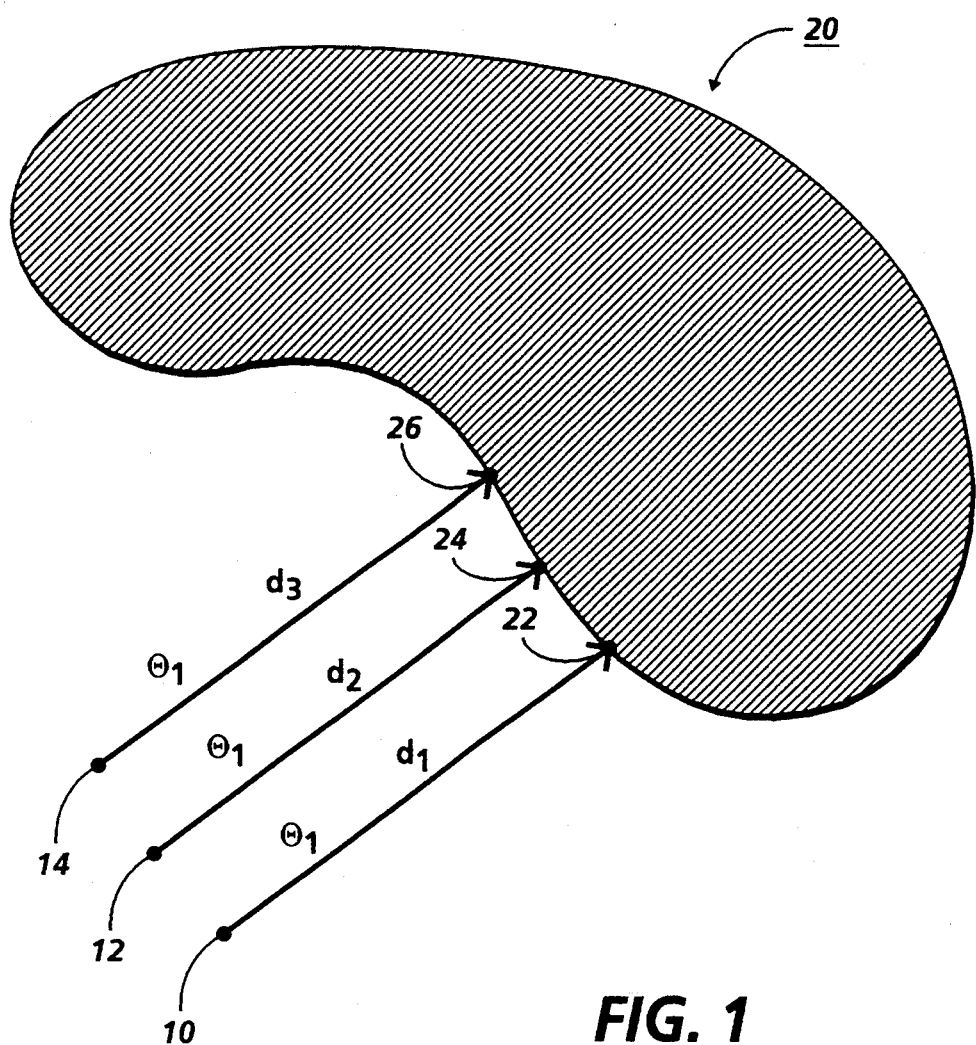
FIG. 1 is a schematic drawing of part of an image, showing how measurement of a characteristic in relation to a number of nearby locations can produce redundant data.

The following conceptual framework is helpful in understanding the broad scope of the invention, and the terms defined below have the meanings indicated throughout this application, including the claims.

"Data" refers herein to signals that indicate information. When an item of data can indicate one of a number of possible alternatives, the item of data has one of a number of "values." For example, a binary item of data has one of two values, such as "0" and "1" or "ON" and "OFF."

"Data" includes data existing in any physical form, and includes data that is transitory or is being stored or transmitted. For example, data could exist as an electromagnetic or other transmitted signal or as a signal stored in electronic, magnetic, or other form.

A "data processing system" is a system that processes data. A "data processor" or "processor" is any component or system that can process data, and may include one or more central processing units or other processing components. A processor performs an operation or a function "automatically" when it performs the operation or function independent of concurrent human control. A "processing unit" is a processor that is a component within another processor.

Any two components are "connected" when there is a combination of circuitry that can transfer data from one of the components to the other. For example, two processing units are "connected" by any combination of connections between them that permits transfer of data from one of the processing units to the other.

"Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "uses" data in performing an operation when the result of the operation depends on the value of the data.

Data "indicates" an attribute when the data has a value that depends on the existence of the attribute or on a measure of the attribute.

Data indicates a "central value" of an attribute when it has a value that depends on a number of measurements of the attribute and indicates the center of the distribution of measurements. For example, data can indicate a central value of distances or of measurements of another scalar quantity by indicating a mean, mode, median, or other measure of central value.

Data indicates a "variance" of an attribute when it has a value that depends on a number of measurements of the attribute and indicates the degree to which the measurements vary. For example, data can indicate a standard deviation, a sum of squares, or other measure of variance.

Data indicates a "distribution" of an attribute when it has a value that depends on a number of measurements of the attribute. For example, data can indicate a distribution of distances or of measurements of another scalar quantity by indicating a measure of central value; a measure of variance; or a measure combining central value and variance such as the values at which the frequency is a specified number of decibels below the frequency of the mode. Data can also indicate a distribution of distances by indicating frequency of each distance or by indicating distances at which maxima of frequency occur.

A "histogram" is data that indicates a distribution of an attribute by indicating frequency of occurrence of the attribute's values. For example, if an attribute is measured over a range of magnitude, a histogram can indicate frequency as a function of magnitude. The range can be divided into parts and the histogram can indicate the number of measurements occurring in each part. Thus a histogram can be used to find maxima of frequency, for example.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

An item of data is produced by "combining" other items of data when logical or numerical operations are performed on the other items of data that yield an item of data of the same type. For example, numbers indicating distance can be combined by adding, by calculating the mean or average, by selecting one of the distances, by taking the square root of the sum of squares, or by another similar operation.

Data is produced "randomly or pseudorandomly" when it is produced by a technique that provides data indicating numbers that, over a sufficiently large group of numbers, are evenly distributed across a range. A "random number" is a number that is produced randomly or pseudorandomly. Unless the context requires otherwise, the word "random" includes both random and pseudorandom.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "stroke" is a mark that appears in a written or printed form of a language. Each character can be formed of one or more strokes, or a single stroke may form more than one character in a cursive script.

A character "has a typeface" when it has an appearance that is characteristic of a typeface. For example, Helvetica and Avant Garde are examples of typefaces that a character could have. Each typeface may include several variations, such as plain, bold, and italic. The term "font" is sometimes used as a synonym for "typeface."

A "text" is an arrangement of one or more lines of characters; the characters of a text may form words. Characters in a text have "a dominant typeface" when a majority of the characters have the typeface. The "skew" or "skew direction" of lines of characters in a text or other lines in an image means the direction in which the lines extend, typically measured as an angle from a reference direction such as horizontal.

An "array of data" or "data array" or "array" is a combination of items of data that can be mapped into an array. A "two-dimensional array" is a data array whose items of data can be mapped into an array having two dimensions.

Data "defines" an array when it includes data sufficient to obtain or produce the array. For example, data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of light. An image may include characters, words, and text as well as other items such as graphics. A text may be included in a set of one or more images, such as in images of the pages of a document.

An image may be divided into "segments," each of which is itself an image. A segment of an image may be of any size up to and including the whole image.

Data "defines" an image when the data includes sufficient information to produce the image. For example, a two-dimensional array can define all or any part of an image, with each item of data in the array providing a value indicating the color of a respective location of the image.

Each location in an image may be called a "pixel." In an array defining an image in which each item of data provides a value, each value indicating the color of a location may be called a "pixel value". Each pixel value is a bit in the "binary form" of the image, a grey-scale value in a "grey-scale form" of the image, or a set of color space coordinates in a "color coordinate form" of the image, the binary form, grey-scale form, and color coordinate form each being a two-dimensional array defining the image.

Data is produced by "applying a criterion" to other data when the produced data indicates whether the other data meets the criterion. An operation that applies a criterion produces such data.

A criterion can be "applied" to a location in an image by applying the criterion to data defining the image in a manner that depends on the location. For example, if the image data includes a respective data item for each location, the criterion could depend on a value indicated by a location's data item or it could depend on the values indicated by the respective data items of a set of locations having a relationship to the location. A location "meets a criterion" if application of the criterion to the location produces data indicating that the location meets the criterion.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the neighboring criterion used.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image.

A characteristic is measured "relative to a location" or "in relation to a location" when the resulting data indicates the characteristic in a manner that depends on the location. For example, a characteristic may be measured relative to a location by measuring a distance in a direction extending from the location to another location that meets a criterion. Or a characteristic may be measured relative to a location by measuring a number of other locations that meet a criterion along each of a number of lines extending through the location.

A characteristic is measured "for an image" if the characteristic is measured in a manner that is likely to produce approximately the same result each time it occurs.

A characteristic is measured "to a degree of statistical significance" if it is measured in a manner that has the probability indicated by the degree of statistical significance of being within one standard deviation of the mean that would be obtained by numerous repeated occurrences of the same measurement.

"Spacing" between connected components, when measured for an image, means one or more prominent values of the distribution of spacings between connected components in the image. "Spacing" between strokes, characters, words, or lines in an image of text similarly means one or more prominent values of the distribution of spacings between strokes, characters, words, or lines in the text. A prominent value could be a maximum of a histogram of spacings, for example.

"Size" of connected components, when measured for an image, means one or more prominent values of the distribution of sizes of connected components in the image. "Width" of strokes in an image of text similarly means one or more prominent values of the distribution of widths of strokes in the text. "Width" of characters in an image of text similarly means one or more prominent values of the distribution of widths of characters in the text, measured in a direction approximately parallel to lines of text. "Height" of characters in an image of text similarly means one or more prominent values of the distribution of heights of characters in the text, measured in a direction approximately perpendicular to lines of text. A prominent value of a size could be a value at which a maximum frequency occurs in a histogram of sizes, for example. A prominent value of a size could alternatively be a maximum size that occurs in an image, such as maximum character width or height.

A "profile" is data defining a characteristic as a function of a variable. For example, a profile may include data indicating a value of the characteristic for each of a number of directions. If the characteristic is a distribution of distances, the profile may include an average or other indication of the distribution of distances at each of the directions. An operation "compares" profiles by producing data indicating a measure of similarity or difference between the profiles. An operation "clusters" profiles by producing data indicating, for each profile, an equivalence class into which it falls, all of the profiles falling in the same equivalence class being similar and profiles in different equivalence classes being different.

A "version" of a first image is a second image produced using data defining the first image. The second image may be identical to the first image, or it may be modified by loss of resolution, by changing the data defining the first image, or by other processes that result in a modified version.

An "image input device" is a device that can receive an image and provide a signal defining a version of the image. A "scanner" is an image input device that receives an image by a scanning operation, such as by scanning a document.

B. General Features

Figure 2:
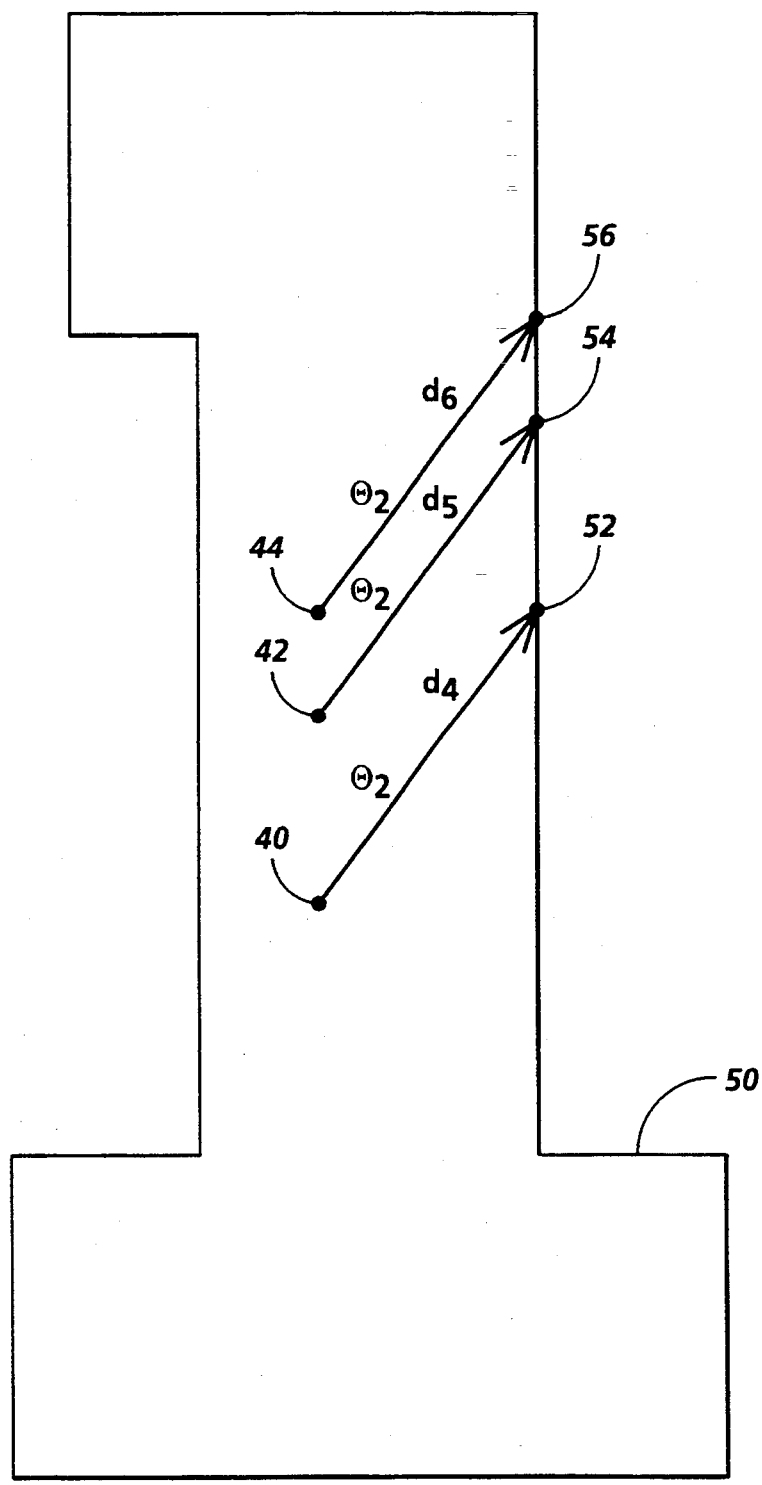
FIG. 2 is a schematic drawing of part of an image, showing another way in which measurement of a characteristic in relation to a number of nearby locations can produce redundant data.
Figure 3:
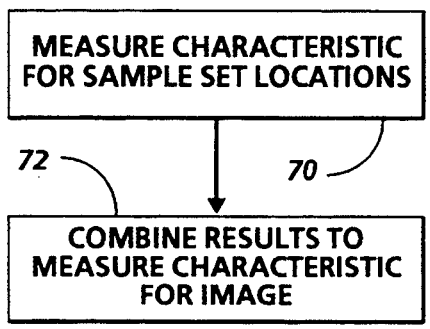
FIG. 3 is a flow chart showing general steps in measuring a characteristic of an image by sampling locations.
Figure 5:
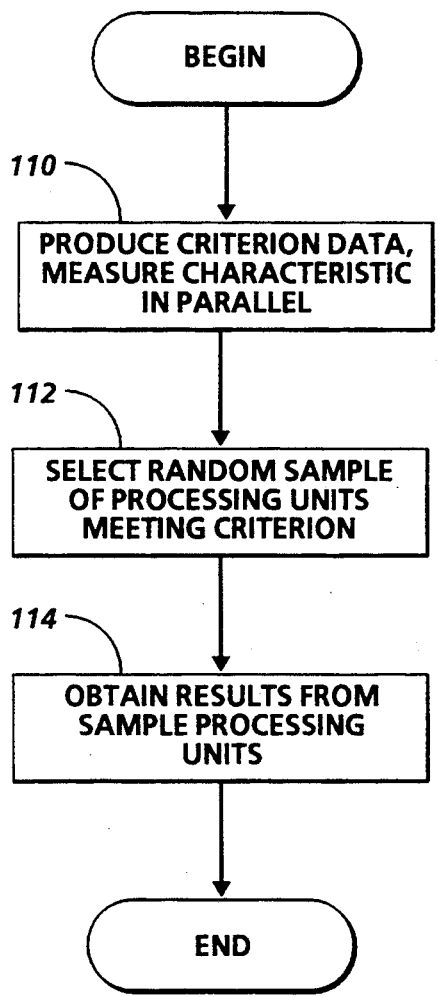
FIG. 5 is a flow chart showing general steps in randomly sampling an image in a parallel implementation.
Figure 4:
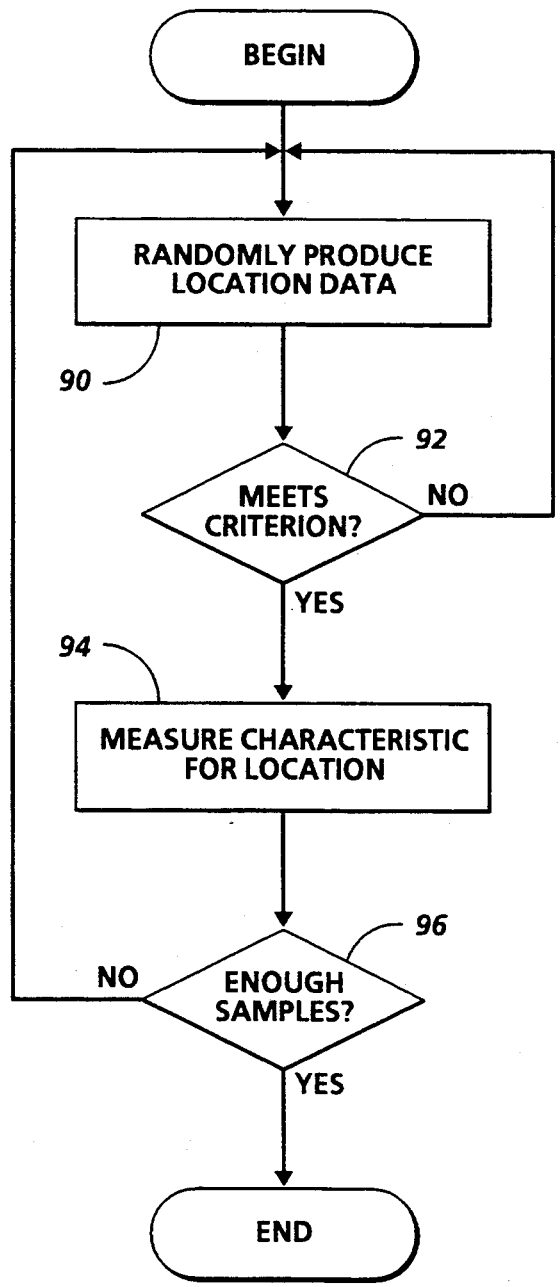
FIG. 4 is a flow chart showing general steps in randomly sampling an image in a serial implementation.
Figure 6:
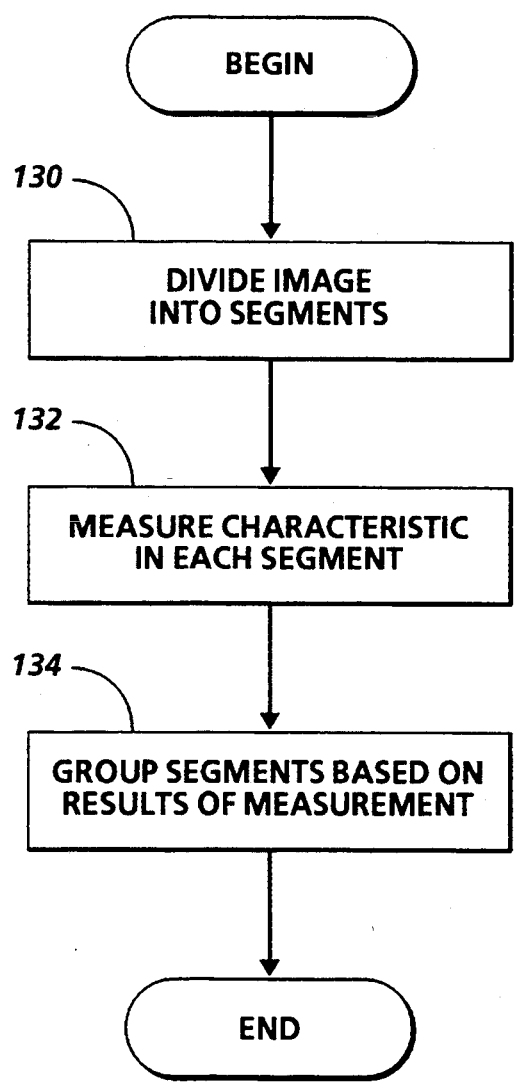
FIG. 6 is a flow chart showing general steps in segmenting an image so that a characteristic can be measured for each segment.

General features of the invention can be understood from FIGS. 1–6. FIG. 1 shows how nearby locations in an image generally have similar characteristics relative to a nearby connected component. FIG. 2 similarly shows how nearby locations in a connected component in an image have similar characteristics relative to an edge of the connected component. FIG. 3 shows how locations of an image can be sampled to measure a characteristic for the image. FIG. 4 shows measurement of a characteristic for locations in a sample set on a serial machine, while FIG. 5 shows measurement for locations in a sample set on a parallel machine. FIG. 6 shows how an image can be segmented into smaller images, each with a prominent value for a characteristic being measured.

Locations 10, 12, and 14 in FIG. 1 are nearby locations relative to which an image characteristic can be measured. The image characteristic illustrated is distance in a direction $\theta_1$ across a white area to the nearest connected component. As shown, the nearest connected component in the direction $\theta_1$ for all three locations 10, 12, and 14 is component 20. The distance from location 10 to location 22 on the edge of component 20 is $d_1$, from location 12 to location 24 is $d_2$, and from location 14 to location 26 is $d_3$. Although $d_1$, $d_2$, and $d_3$ are different from each other, the differences between them are relatively small. Unless a very small unit of measure is used, the image characteristic for locations 10, 12, and 14 is the same. Therefore, measuring the characteristic relative to all three locations would produce redundant data.

Locations 40, 42, and 44 in FIG. 2 are similarly nearby locations in connected component 50. The image characteristic illustrated is distance in a direction $\theta_2$ across a black area to the nearest edge of connected component 50. The distance from location 40 to location 52 on the edge of component 50 is $d_4$, from location 42 to location 54 is $d_5$, and from location 44 to location 56 is $d_6$. Although $d_4$, $d_5$, and $d_6$ are again different from each other, the differences between them are again relatively small so that measuring the characteristic relative to all three locations would produce redundant data.

FIG. 3 shows general steps in measuring a characteristic of an image by measuring the characteristic for a sample set of locations. This technique can be used to reduce redundant measurements as illustrated by FIGS. 1 and 2. The step in box 70 measures the characteristic for the sample set locations. The step in box 72 then combines the results from box 70 to obtain a measure of the characteristic for the image.

The steps in FIG. 3 reduce redundancy of the type illustrated by FIGS. 1 and 2, but are subject to aliasing if the sample set locations are selected in a regular or uniform pattern. A regularly or uniformly occurring feature in an image may be ignored or misinterpreted if it occurs in a pattern such that none of its occurrences is at a location in the sample set or such that it occurs at all locations in the sample set but not at other locations. For example, a regular sampling of every nth location can result in aliasing if a feature of the image occurs at intervals that are n locations apart. The problem of aliasing can be avoided by randomly or pseudorandomly selecting sample set locations.

FIG. 4 shows an example of how the step in box 70 in FIG. 3 could be implemented with random selection on a serial machine. The step in box 90 begins by randomly producing location data indicating a location in the image being sampled. The step in box 92 then branches based on whether the indicated location meets a sample set criterion. If not, the step in box 90 is performed again, but if the indicated location meets the criterion, the step in box 94 measures an image characteristic relative to the location. The step in box 96 then branches based on whether enough locations have been sampled to measure the characteristic for the image. If not, the step in box 90 is performed again.

FIG. 5 shows how the step in box 70 in FIG. 3 could be implemented with random selection on a parallel machine in which each location in the image has a respective processing unit that, stores a data item for the location in local memory. The step in box 110 operates the processing units in parallel so that each processing unit produces criterion data indicating whether its location meets a sample set criterion and results data indicating the result of measuring an image characteristic relative to its location. In performing this step, the processing units may communicate in order to obtain necessary data from other processing units. The step in box 112 then selects a random sample set from the processing units whose criterion data indicates that their locations meet the criterion. The results data from the sample set is obtained in box 114.

FIG. 6 shows how an image that includes more than one part, each with a prominent value for a characteristic being measured, can be divided into segments, for each of which the characteristic can be measured. The step in box 130 begins by dividing the image into starting segments, such as lines or words in the case of an image that includes text. This can be done by operating on the image data to produce segment data defining each starting segment. The step in box 132 then measures the characteristic in each starting segment, which can be done by obtaining result data for a sample of locations in each segment and combining the result data to obtain a combined result for the segment. Then the step in box 134 groups the starting segments into larger segments based on the measurements from box 132 to obtain segments that each have a prominent value for the characteristic being measured. This can be done by using the combined results to determine which starting segments should be included in a group, thus producing grouped segment data defining a larger segment that includes the segments in the group.

C. Statistical Significance

According to statistical sampling theory, the variance of a distribution is inversely proportional to the square of the number of samples necessary to obtain a given level of statistical significance in sampling the distribution. Therefore, if variance is known or can be determined analytically from factors such as the image characteristic being measured and the number of locations in the image, the necessary number of samples could theoretically be determined through calculations.

As a practical matter, variance of an image characteristic is often not known in advance and cannot be determined analytically. Therefore, a heuristic application of statistical sampling theory can be used to obtain a number of samples to be obtained. A simple heuristic is to choose an initial number of samples and make two measurements using the chosen number; if the two measurements are the same or approximately the same, the chosen number is sufficiently large, but if not, the chosen number can be incremented and two measurements can be made at the incremented number, and so forth.

Using this heuristic, it has been found that 1000 samples are sufficient in measuring distance as a function of direction to obtain information about skew or font and 5000 are sufficient in measuring horizontal and vertical distances across and between connected components to obtain information about character and stroke sizes and spacings, while 24 samples are sufficient in measuring variance of numbers of pixels of a given color along lines in a given direction to obtain information about skew. These results can be explained based on the variance of the underlying measurement: Distance measurement, either as a function of direction or in the horizontal and vertical directions, has a relatively large variance, so that it requires a relatively large number of samples. Variance, itself a statistical measure, has a relatively small variance, so that a relatively small number of samples is required to measure it for an image.

D. Implementations

The general features described above could be implemented in numerous ways on various machines to measure a wide variety of image characteristics.

1. Serial Implementation

Specific serial implementations of the invention are described in copending, coassigned U.S. patent application Ser. No. 07/737,957, entitled "Image Processing Using Distance as a Function of Direction," now issued as U.S. Pat. No. 5,245,674; U.S. patent application Ser. No. 07/737,948 entitled "Image Analysis to Obtain Typeface Information, " now issued as U.S. Pat. No. 5,253,307; U.S. patent application Ser. No. 07/737,863, entitled "Course and Fine Skew Measurement"; and U.S. patent application Ser. No. 07/737,955, continued as application Ser. No. 08/077,702, entitled "Measuring Character and Stroke Sizes and Spacings For an Image", all of which are incorporated herein by reference.

Figure 7:
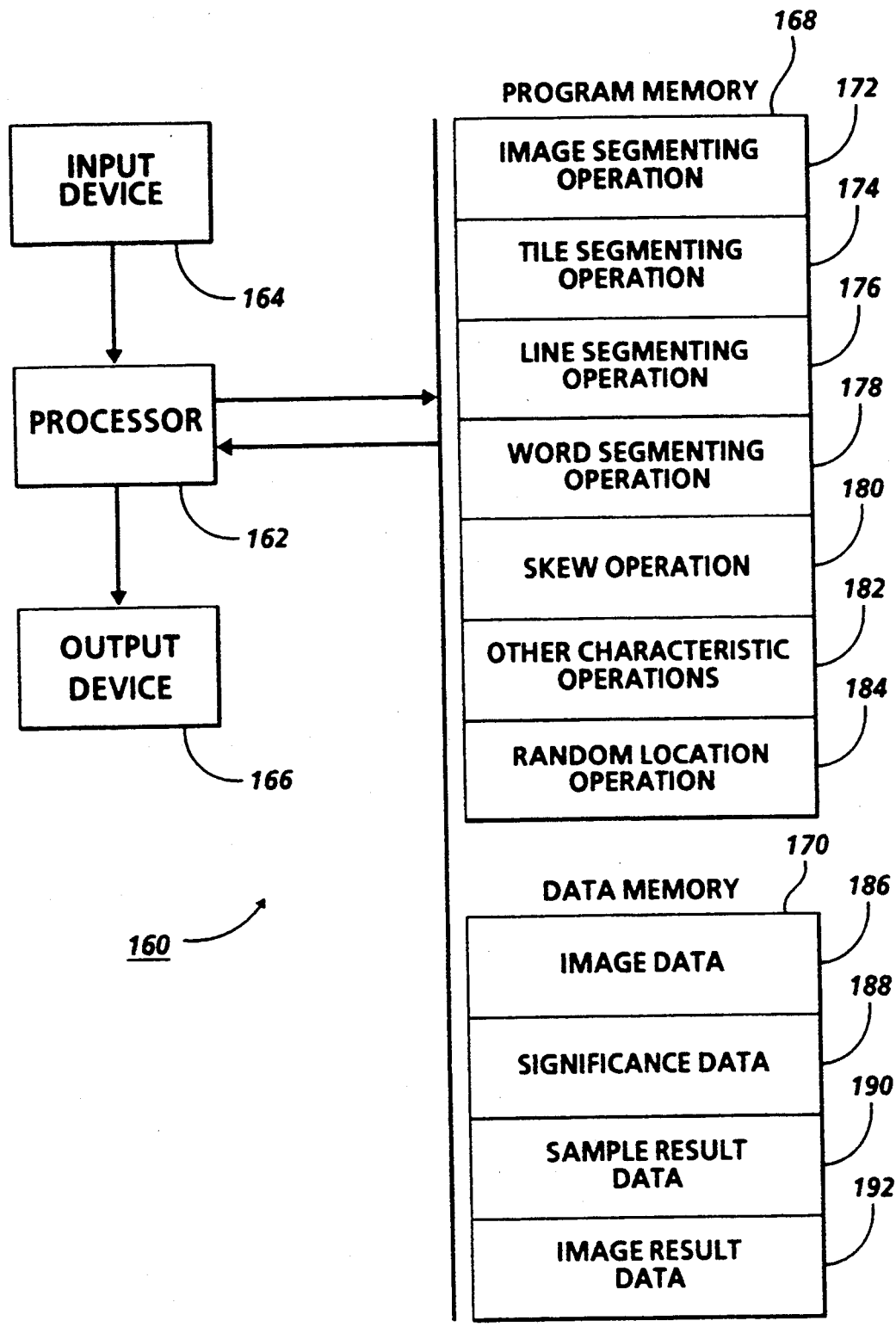
FIG. 7 is a schematic block diagram showing components of a system implementing image processing in which a characteristic is measured by randomly sampling locations.
Figure 8:
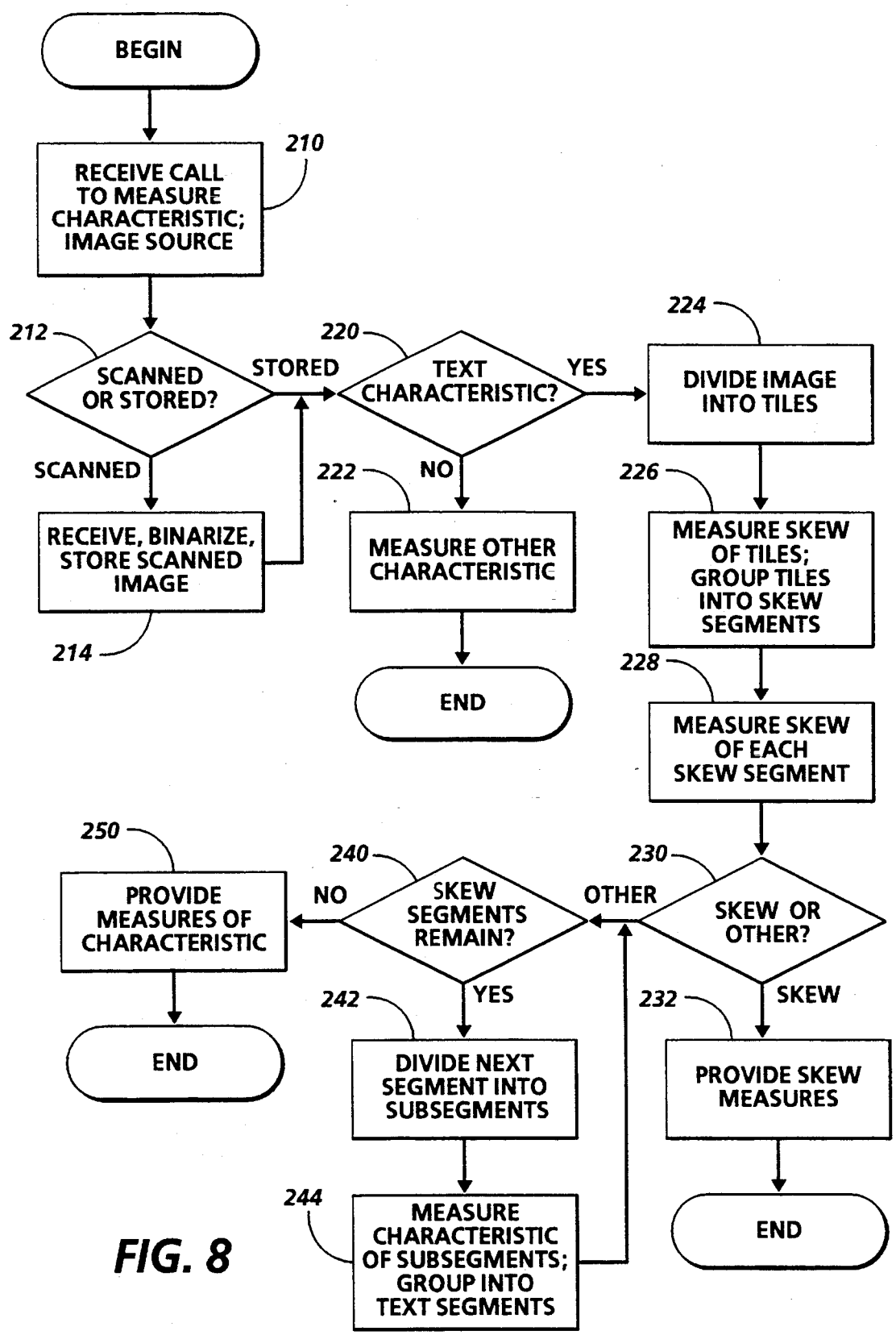
FIG. 8 is a flow chart showing steps in measuring a characteristic of an image by segmenting the image and measuring the characteristic for each segment.
Figure 9:
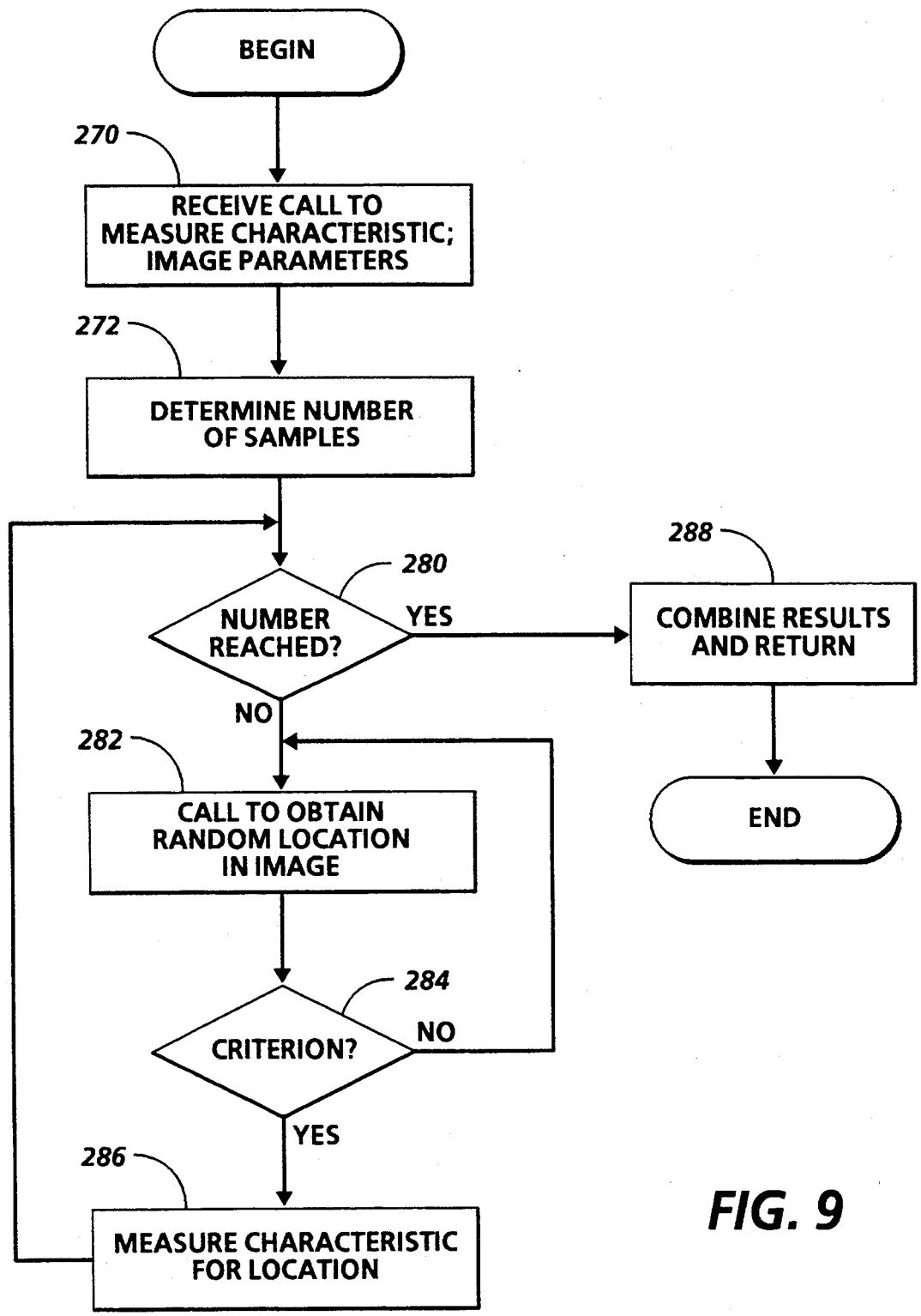
FIG. 9 is a flow chart showing steps in measuring a characteristic of an image by randomly sampling locations that meet a criterion.
Figure 10:
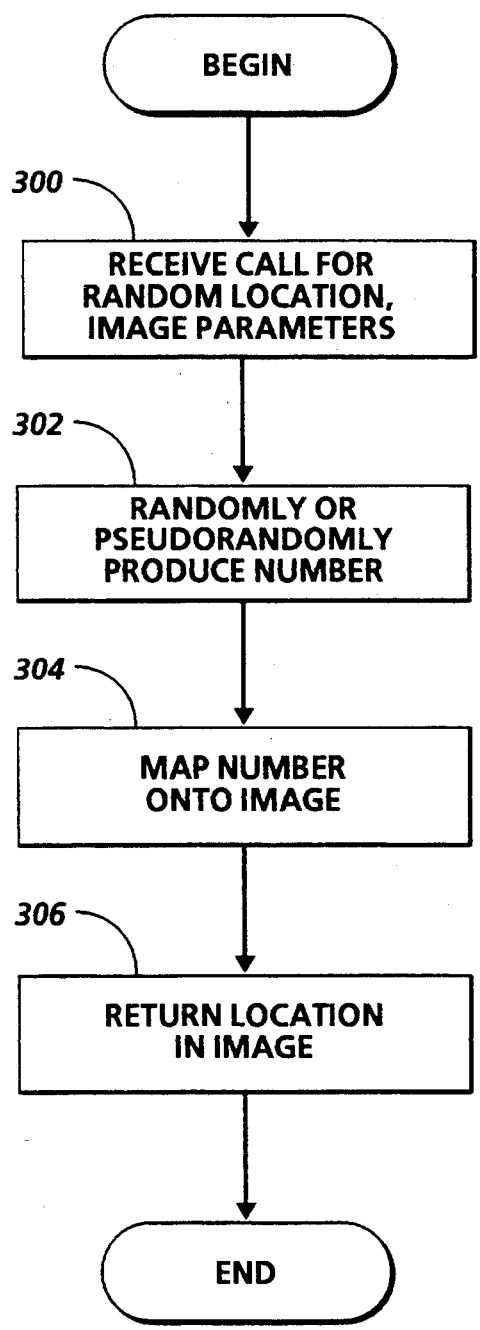
FIG. 10 is a flow chart showing steps in obtaining a random location within an image.

FIG. 7 shows one way the invention could be implemented in a serial machine. FIG. 8 shows steps in segmenting an image. FIG. 9 shows general steps followed in measuring a characteristic. FIG. 10 shows more specifically how data indicating a random location in an image can be obtained.

System 160 in FIG. 7 includes processor 162, connected for receiving input data from input device 164 and for providing output data to output device 166. Processor 162 can be the CPU of a workstation, and input device 164 and output device 166 can be I/O devices. For example, input device 164 can be an image input device such as a scanner or a digital image source. Also input device 164 can provide a connection to a peripheral storage device or other storage or transmission medium from which model profiles that indicate distance as a function of direction can be received. Similarly, output device 166 can be a device for providing data obtained by processor 162, such as data indicating an image characteristic.

During operation, processor 162 executes instructions from program memory 168 and accesses data memory 170 to read and write data. Program memory 168 stores instructions for performing a number of operations of processor 162. Data memory 170 stores data as shown and can also temporarily store intermediate data used by processor 162 in performing its operations.

Processor 162 can perform image segmenting operation 172 to measure an image characteristic for segments of an image. The call to image segmenting operation 172 can include data identifying the characteristic to be measured. As discussed in greater detail below, image segmenting operation 172 can in turn call tile segmenting operation 174, line segmenting operation 176, word segmenting operation 178, skew operation 180, and other characteristic operations 182 in order to divide the image into segments, each having a prominent value for the characteristic to be measured. Skew operation 180 and other characteristic operations 182 can call random location operation 184 in order to obtain data identifying a location to be sampled.

In performing image segmenting operation 168, the segmenting operation 174, line segmenting operation 176, word segmenting operation 178, skew operation 180, and other characteristic operations 182, processor 162 can access image data 186 in data memory 170 to obtain data about the image being analyzed and to obtain data for a specific location in the image. In executing skew operation 180 and other characteristic operations 182, processor 162 can access significance data 188 to obtain data indicating the number or proportion of locations that must be sampled in order to measure a characteristic to a desired level of statistical significance; in performing these operations, processor 162 can also produce and store sample result data 190 and image result data 192.

FIG. 8 shows how image segmenting operation 168 can be implemented. The step in box 210 begins by receiving a call to measure a specified image characteristic. The call also indicates the source of the image to be analyzed. The step in box 212 branches based on the image source: If the image is to be scanned, the step in box 214 receives the scan data from input device 164, binarizes it, and stores it in data memory 170. This step could also include preprocessing of the image data to reduce noise or eliminate other irrelevant data.

The step in box 220 branches based on whether the characteristic to be measured is a characteristic of text, such as skew, typeface, or character size and spacing. If not, the step in box 222 measures the characteristic through other appropriate techniques.

In measuring a text characteristic, it is generally necessary to determine skew. Therefore, the step in box 224 begins by dividing the image into tiles, such as rectangles, with an appropriate call to file segmenting subroutine 174. The step in box 226 then measures the skew of tiles, making appropriate calls to skew subroutine 180, and then groups the tiles into skew segments based on skew. This step could measure skew for all tiles and then group tiles into skew segments according to similarity or could use another strategy that does not require that every tile be measured, such as growing skew segments beginning with seed tiles. In any case, if neighboring tiles have skew that is sufficiently different, they should not be included in the same skew segment.

When skew segments have been obtained, the step in box 228 again makes calls to skew subroutine 180, this time to measure the skew of each skew segment. Then, the step in box 230 branches based on whether or not the characteristic being measured is skew. If so, the step in box 232 provides the results from box 228, completing the measurement of skew.

For characteristics other than skew, the step in box 240 begins an iterative loop, each iteration of which measures the characteristic for one of the skew segments. The step in box 242 begins an iterative loop by dividing the next skew segment into subsegments. This can be done with calls to line segmenting operation 176 and word segmenting operation 178, which can be implemented with parsing techniques similar to those described in copending, coassigned U.S. patent application Ser. No. 07/459,022, now continued as application Ser. No. 08/039,5 entitled "Editing Text in an Image" and incorporated herein by reference. The calls to line segmenting operation 176 and word segmenting operation 178 can include the skew measured for the skew segment being divided. Line segmenting operation 176 can find blank spaces extending across the skew segment at the same angle as the skew, then treating the segment between adjacent blank spaces as a line segment. Word segmenting operation 178 can find blank spaces extending across a line segment at an angle perpendicular to the skew and having a minimum width greater than the probable intercharacter spacing within a word, then treating the segment between adjacent blank spaces as a word segment.

When a skew segment has been divided into subsegments, the step in box 244 measures the characteristic for subsegments so that subsegments for which the characteristic is approximately the same can be grouped into text segments. In this case, it may be necessary to measure the characteristic for every subsegment, since an isolated word could have a different dominant typeface or a different character size and spacing.

When all skew segments have been handled, the step in box 250 provides the results obtained for each skew segment. If the image includes only one skew segment, the result measures the characteristic for the image as a whole.

Although the technique of FIG. 8 automatically finds segments, for each of which an image characteristic can be measured, other approaches could be used. An image to be analyzed could be segmented based on information from a human operator. Or the image could be assumed to have a single prominent value for the characteristic, which will be true in many cases. Also, before the steps in boxes 224 and 242, additional tests could be performed to determine whether the image appears to have a single prominent value, making segmentation and grouping unnecessary. For example, if the image has a single dominant typeface, it is not necessary to segment and group in order to determine typeface. Similarly, if the result of skew measurement for the image as a whole as described below in relation to FIG. 11 has a minimum that is less than one-third of the range between the lowest and highest combined distance values, then the image has a prominent skew and need not be divided into skew segments; this threshold is based on the observation that the interline distance is typically at least three times as large as the intercharacter distance.

FIG. 9 illustrates general steps implementing the measuring operations in boxes 222, 226, 228, and 244. Specific implementations of several measuring operations are set forth in more detail below.

The step in box 270 begins upon receiving a call to measure a specified characteristic. This call includes parameters of the image for which the characteristic is to be measured. As described in relation to FIG. 8, the image may be a segment of another image, such as a tile, a skew segment, a word segment, or a text segment. The image parameters may include data indicating the starting location of data defining the image in memory and its dimensions, measured, for example, in pixels.

Based on the data received in box 270, the step in box 272 determines the number of samples to be taken. This step is optional, because the number could be determined in advance, such as by setting a global variable or by including a constant equal to the number of samples to be taken. As described above in relation to FIG. 7, significance data 188 can include data indicating a number or proportion of locations in an image that must be sampled to provide a desired degree of statistical significance for a specific characteristic. Using the dimensions of the image, for example, the number of pixels in the image can be determined and multiplied by the proportion that must be sampled for the characteristic being measured to obtain the number of samples to be obtained.

The step in box 280 begins an iterative loop that generally allows the steps in FIG. 4, obtaining samples until the number from box 272 is reached. The step in box 282 calls random location operation 184 to obtain a random location within the image being measured. This call can include parameters of the image from box 270.

The step in box 284 applies the sample set criterion for the characteristic being measured to the location obtained in box 282. If the location does not meet the criterion, the step in box 282 is repeated to obtain another location. When a location is obtained that meets the criterion, the step in box 286 takes the steps necessary to measure the characteristic for the location.

When the number of samples from box 272 is reached, the step in box 288 combines the measurements taken by each iteration of box 286 into a measure of the characteristic for the image. This measure is returned to the process that provided the call received in box 270.

As discussed in greater detail below, the steps in boxes 286 and 288 can be allocated differently. For example, all of the locations could be obtained and stored, omitting the step in box 286 entirely, and then the step in box 288 could measure the characteristic for the locations and combine the results. Or, the step in box 286 could include operations that combine each measurement with previous measurements as it is obtained, in which case the step in box 288 performs any final operations necessary to combine the measurements before the combined result is returned. The choice of how to implement these steps can depend on efficiency or other practical considerations.

FIG. 10 shows an implementation of random location operation 184, called in box 282 in FIG. 9. The step in box 300 begins upon receiving a call to provide a random location, including image parameters. The image parameters can include data indicating the starting location of data defining the image in memory, its dimensions measured in pixels, and its total number of pixels.

The step in box 302 produces a random number through conventional random or pseudorandom number generating techniques. The step in box 304 then maps the random number from box 302 onto the image defined by the image parameters from box 300 to find a location in the image. For example, a random number could be produced between zero and the total number of pixels in the image; the random number could then be divided by the number of rows in the image, with the integer result of division indicating the row in which a pixel occurs and with the remainder indicating the position of the pixel within the row. The step in box 806 returns the location obtained in box 304 to the process that called random location operation 184.

The following sections provide examples of how the general technique in FIG. 9 can be implemented to measure characteristics that provide information about skew, typeface, and character size and spacing.

2. Skew

Figure 11:
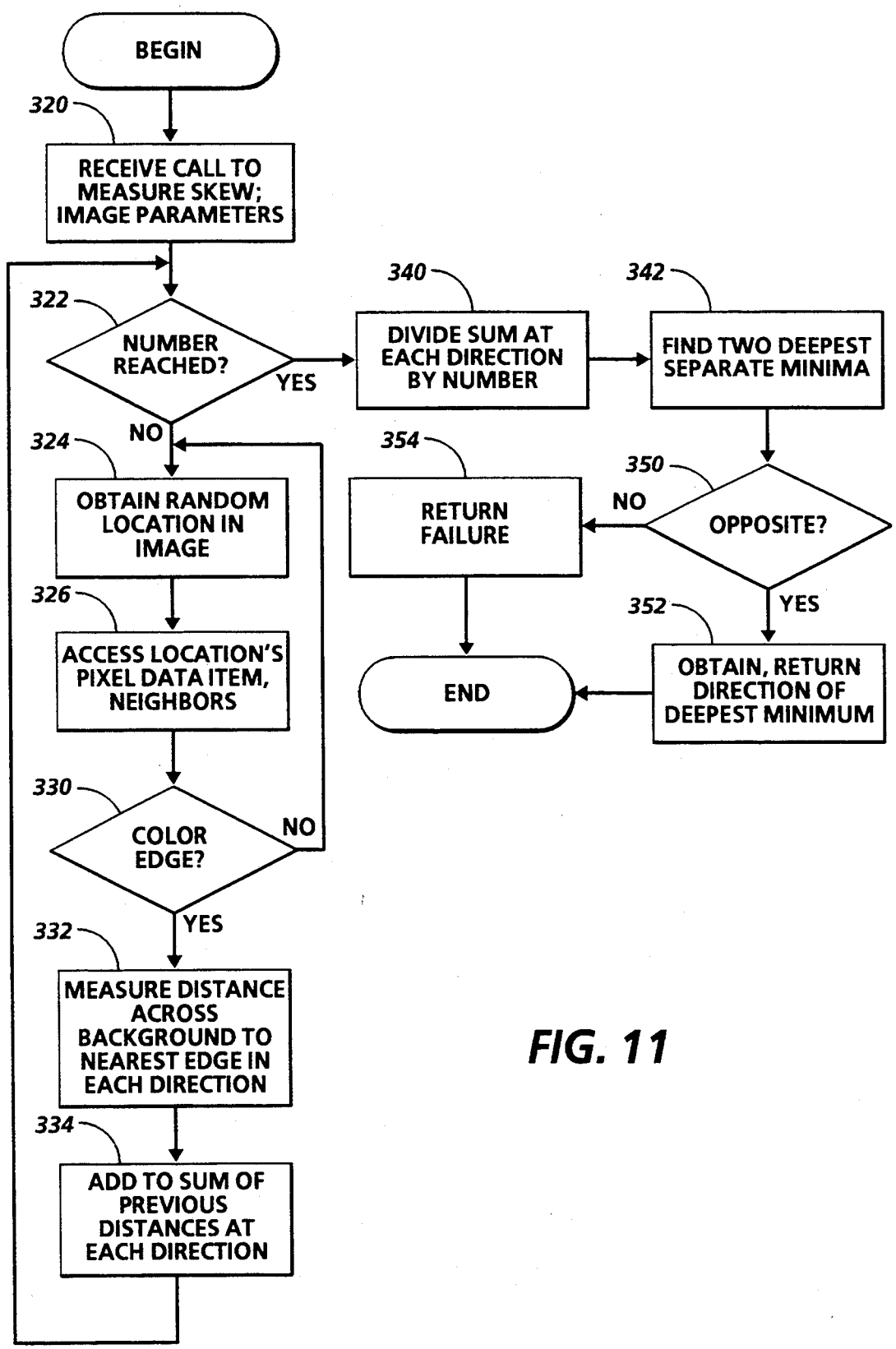
FIG. 11 is a flow chart showing steps in obtaining an approximation of skew by random sampling and measuring distances between connected component edges.
Figure 12:
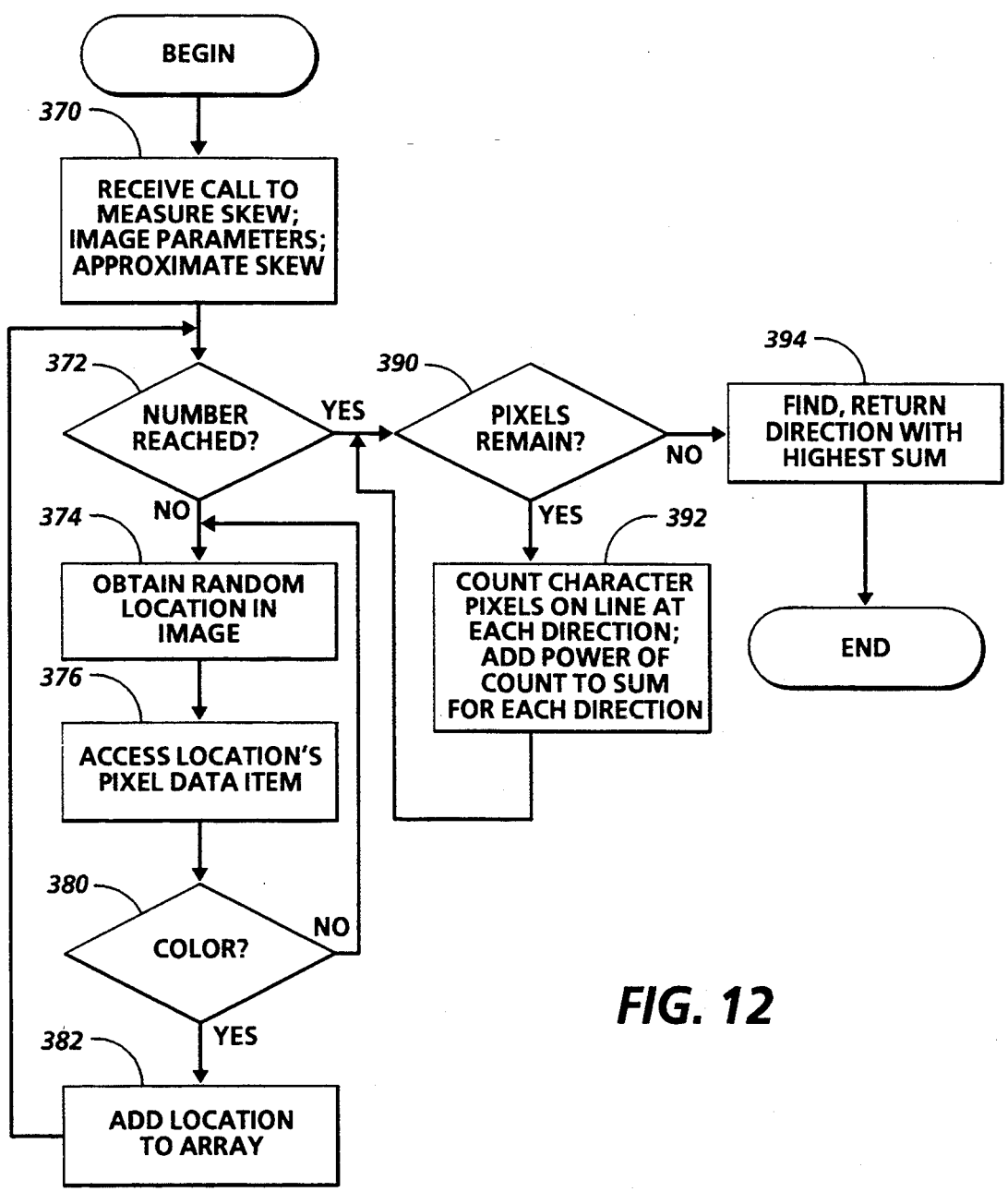
FIG. 12 is a flow chart showing steps in obtaining a more precise approximation of skew by random sampling and obtaining a variance of character pixel counts for directions around an approximation of skew.
Figure 13:
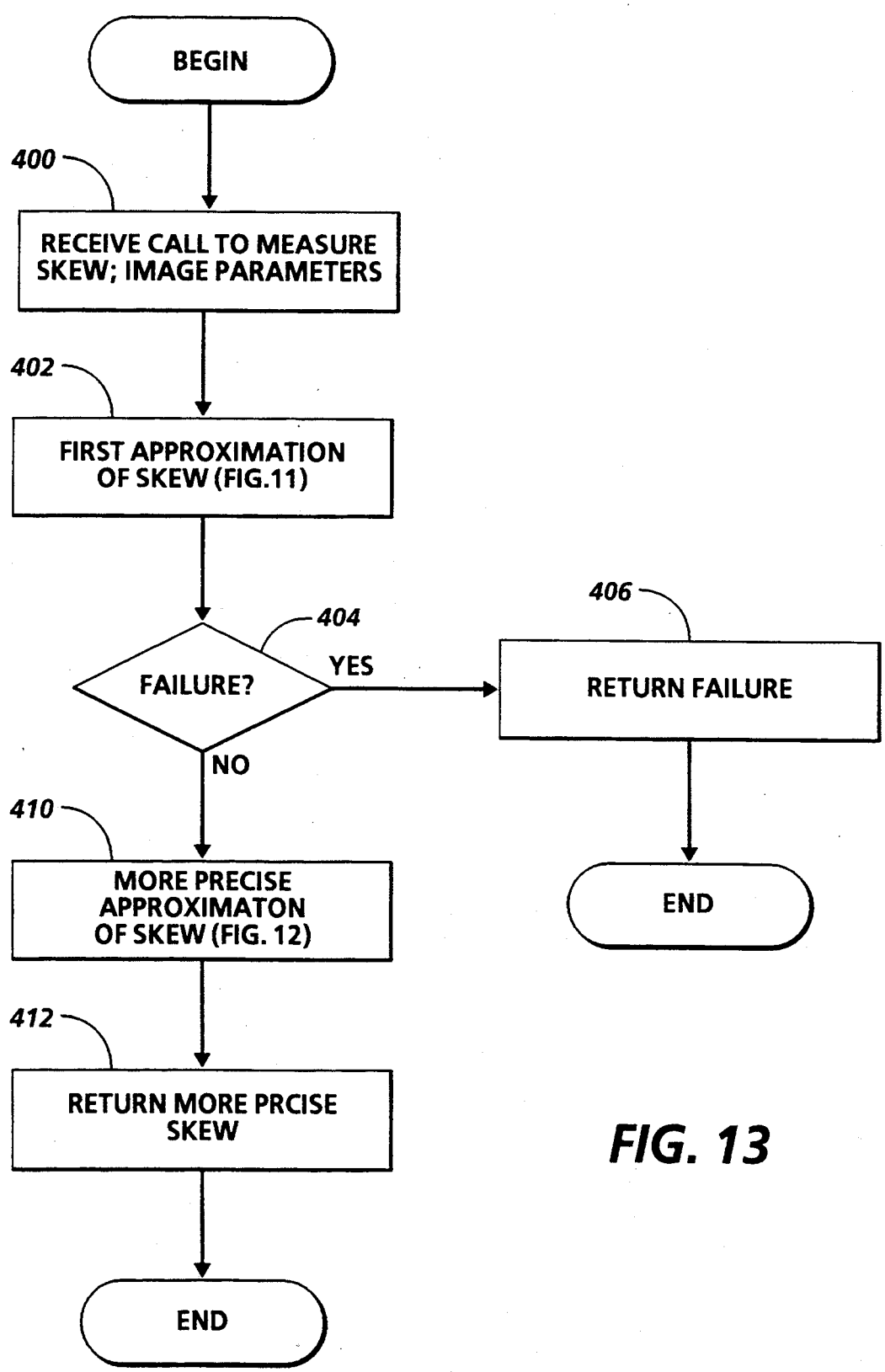
FIG. 13 is a flow chart showing how the techniques of FIGS. 11 and 12 can be used together in measuring skew.

The steps in boxes 226 and 228 in FIG. 8 measure skew of lines of text in an image. FIG. 11 illustrates a technique for measuring skew by measuring distances between edge pixels in a large number of directions. FIG. 12 illustrates a technique for measuring skew by measuring numbers of black pixels in lines at several directions that cover a range. The techniques of FIGS. 11 and 12 generally follow the steps in FIG. 9, although each is different from FIG. 9 in a number of ways. FIG. 13 illustrates how the techniques of FIGS. 11 and 12 could be used together to perform the steps in boxes 226 and 228 in FIG. 8.

The steps in FIG. 11 assume that the number of samples to be obtained in measuring skew has been determined in advance and is available in the form of a global variable, for example. The step in box 320 in FIG. 11 begins by receiving a call to measure skew together with parameters of the image for which skew is to be measured. The step in box 322 begins an iterative loop that obtains samples until the number of samples indicated by the global variable is reached. The step in box 324 obtains a random location within the image being measured, such as by calling random location subroutine 184. The step in box 326 then accesses the pixel data item of the random location from box 324 and also accesses the pixel data items of neighboring locations.

The step in box 330 applies a sample set criterion that determines whether the random location's pixel data item indicates an appropriate color, either black or white, and whether one of the neighboring locations is the opposite color, so that the random location is an edge pixel. If not, another random location is obtained in box 324.

When a pixel is found that meets the sample set criterion, the step in box 332 measures distance across the background color to the nearest edge in each of a number of directions. If the image has black characters on a white background, for example, distance can be measured across white pixels to the nearest black edge pixel or to the nearest white edge pixel. The step in box 334 adds the distance obtained at each direction to the sum of previously obtained distances at that direction, thus performing part of the operation of combining the measurements of distance obtained at each direction.

When the number of samples is obtained, the step in box 340 can complete the operation of combining measurements by dividing the sum of distances at each direction by the number of samples obtained, producing an average distance at each direction; this step is optional, because skew can be determined without averaging the distances. The average distances form a profile that is then analyzed to find the two deepest separate minima, in box 342. In other words, if the two deepest minima are at directions separated by less than some minimum angle ε, they are treated as part of the same minimum rather than as separate minima. The step in box 350 then determines whether the deepest separate minima from box 342 are at approximately opposite directions. This will be true if the directions are separated by 180±ε degrees. If so, the step in box 352 obtains the direction of the deepest minimum and returns it to the process that called for skew measurement. But if not, the step in box 354 returns a value indicating failure, which will typically occur if the image being analyzed is not an image of text or if the text includes lines extending in various directions so that no direction is prominent.

The steps in FIG. 12 assume that the number of samples to be obtained in measuring skew has been determined in advance and is available in the form of a constant included in a subroutine, for example. The step in box 370 in FIG. 12 begins by receiving a call to measure skew together with parameters of the image for which skew is to be measured and with an approximate skew angle. The step in box 372 begins an iterative loop that obtains sample locations until the number of sample locations indicated by the constant is reached. The step in box 374 obtains a random location within the image being measured, such as by calling random location subroutine 184. The step in box 376 then accesses the pixel data item of the random location from box 374.

The step in box 380 applies a sample set criterion that determines whether the random location's pixel data item indicates the color of pixels within characters, either black for black characters on a white background or white for white characters on a black background. If not, another random location is obtained in box 374.

When a pixel is found that meets the sample set criterion, the step in box 382 adds the pixel's location to an array of sample set locations. Then, when the number of sample locations has been obtained, the step in box 390 begins an iterative loop that goes through the locations in the array. For each location, the step in box 392 counts the character pixels on a line through the location in each of a number of directions covering a range around the approximate skew received in box 370. As each count is obtained, an operation such as squaring is performed and the result is added to the sum of previous results for the same direction to produce a measure of variance in each direction.

When all the locations in the array have been handled, the operations of measuring a characteristic and combining results are completed. The step in box 394 finds the direction with the largest sum of results, meaning that the variance between the lines in that direction is the greatest. (Postl, W., "Detection of Linear Oblique Structures and Skew Scan in Digitized Documents," *Eighth International Conference on Pattern Recognition*, Paris, France, Oct. 27–31, 1986, proceedings, IEEE Computer Society Press, Washington, D.C., 1986, pp. 687–689, describes a similar sum-of-squares measure of skew, with FIG. 7 showing an extremum occurring at the dominant angle of skew. Postl mentions at page 688 that after a raster transform only every 16th line was evaluated, an apparent example of regular sampling. As noted above, regular sampling could result in aliasing by producing measurements that could be misinterpreted. The step in box 394 therefore returns the direction with the largest sum of results as the angle of skew.

The steps in FIG. 13 illustrate how the techniques of FIGS. 11 and 12 can be used together in skew detection. The step in box 400 begins by receiving a call to measure skew, with parameters of the image for which skew is to be measured. The step in box 402 makes a measurement to obtain a first approximation of skew, using the technique of FIG. 11. The step in box 404 branches on the result returned. If the result indicates failure, the step in box 406 returns failure to the process from which the call was received in box 400.

If the result from the technique of FIG. 11 is an angle of skew, the step in box 410 uses this angle as the approximate skew in making a second measurement to obtain a more precise approximation of skew, using the technique of FIG. 12. The step in box 412 then returns the more precise skew measurement to the process from which the call was received in box 400.

Detailed techniques for performing some of the steps in FIG. 13 are described in copending, coassigned U.S. patent application Ser. No. 07/737,863, entitled "Coarse and Fine Skew Measurement," incorporated herein by reference.

3. Typeface

Figure 14:
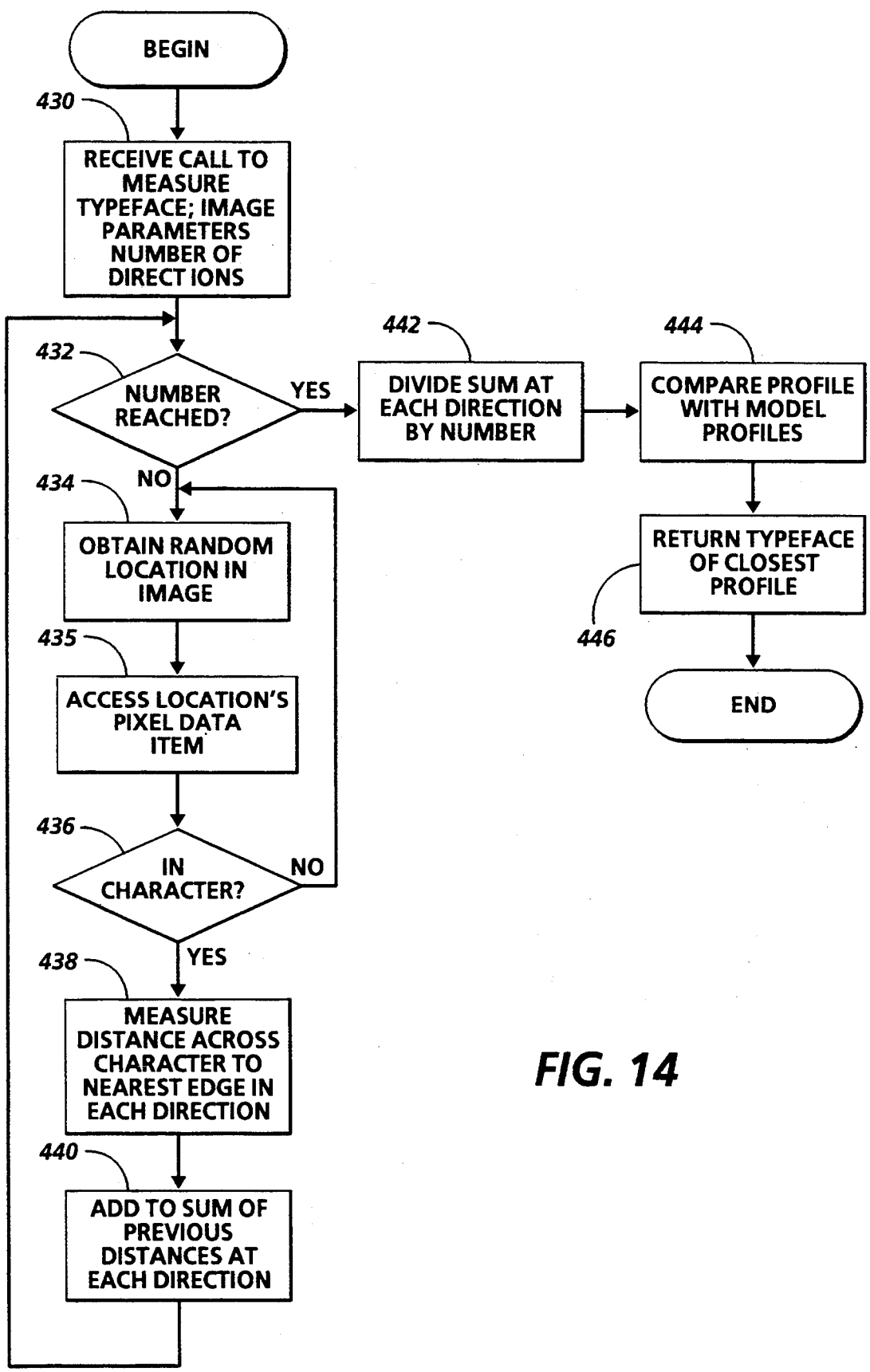
FIG. 14 is a flow chart showing steps in measuring dominant typeface by random sampling.

The step in box 244 in FIG. 8 can measure dominant typeface of text in an image. FIG. 14 illustrates a technique for measuring dominant typeface by measuring distances from a pixel within a character to edge pixels in a large number of directions. The technique of FIG. 14 generally follows the steps in FIG. 9, although it differs from FIG. 9 in a number of ways.

The steps in FIG. 14 assume that the number of samples to be obtained in measuring dominant typeface has been determined in advance and is available in the form of a global variable, for example. The step in box 430 in FIG. 14 begins by receiving a call to measure dominant typeface together with parameters of the image for which dominant typeface is to be measured and with a number of directions in which distance measurements should be taken. The step in box 432 begins an iterative loop that obtains samples until the number of samples indicated by the global variable is reached. The step in box 434 obtains a random location within the image being measured, such as by calling random location operation 184. The step in box 435 then accesses the pixel data item of the random location from box 434.

The step in box 436 applies a sample set criterion that determines whether the random location's pixel data item indicates an appropriate color for a pixel internal to a character, either black or white depending on whether the image includes black text on a white background or white text on a black background. Alternatively, this criterion could determine whether the random location is a pixel at an edge of a character. If the pixel does not meet the criterion, another random location is obtained in box 434.

When a pixel is found that meets the sample set criterion, the step in box 438 measures distance across the character color to the nearest edge in each of the number of directions received in box 430. If the image has black characters on a white background, for example, distance can be measured across black pixels to the nearest black edge pixel or to the nearest white edge pixel. The step in box 440 adds the distance obtained at each direction to the sum of previously obtained distances at that direction, thus performing part of the operation of combining the measurements of distance obtained at each direction.

When the number of samples is obtained, the step in box 442 completes the operation of combining measurements by dividing the sum of distances at each direction by the number of samples obtained, producing an average distance at each direction. The step in box 444 then compares the profile formed by the average distances with a number of model profiles, each representative of a respective typeface. This comparison can be performed, for example, by obtaining a distance measure such as the square root of the sum of the differences at each of a number of paired points on two profiles being compared. The step in box 446 then returns data indicating the typeface of the model profile closest to the profile from box 442, thus completing the measurement of dominant typeface.

Detailed techniques for performing some of the steps in FIG. 14 are described in copending, coassigned U.S. patent application Ser. No. 07/737,948, entitled "Image Analysis to Obtain Typeface Information," now issued as U.S. Pat. No. 5,253,307, incorporated herein by reference.

Profiles produced by the technique of FIG. 14 can also be used in a classification technique that clusters a number of profiles into equivalence groups.

The comparison in box 444 must somehow compensate for skew and scale differences. One way to compensate for skew in the technique of FIG. 8 is to use the results of the measurement of skew in box 228 in FIG. 8 in each direction in box 450 in FIG. 14, such as by making the first measurement at the angle of skew. Scale can be compensated by normalizing the profiles before making a comparison.

4. Character and Stroke Sizes and Spacings

Figure 15:
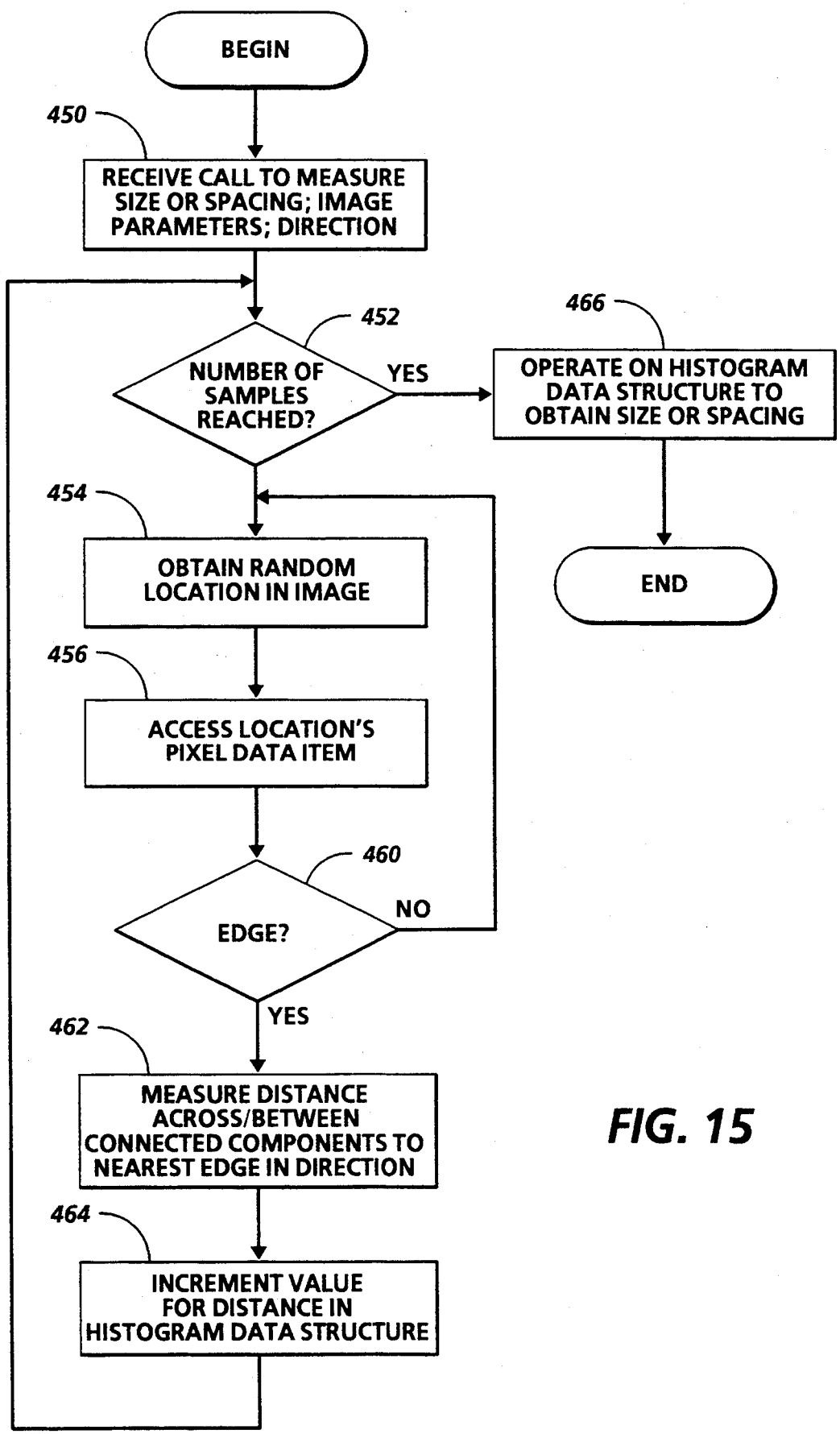
FIG. 15 is a flow chart showing steps in measuring character or stroke size or spacing by random sampling.

The step in box 244 in FIG. 8 can measure sizes or spacings of characters or strokes in text in an image. FIG. 15 illustrates a technique for measuring a character or stroke size or spacing by measuring distances between pixels at connected component edges in a given direction. The technique of FIG. 15 generally follows the steps in FIG. 9, although it differs from FIG. 9 in a number of ways.

The steps in FIG. 15 assume that the number of samples to be obtained in measuring sizes or spacings has been determined in advance and is available in the form of a global variable, for example. The step in box 450 in FIG. 15 begins by receiving a call to measure a size or spacing of characters together with parameters of the image for which the size or spacing is to be measured. Included in the call is an indication of the direction in which the size or spacing is to be measured. If a size is to be measured, the measurements are across connected components, but if a spacing is to be measured, the measurements are between connected components.

The step in box 452 begins an iterative loop that obtains samples until the number of samples indicated by the global variable is reached. The step in box 454 obtains a random location within the image being measured, such as by calling random location operation 184. The step in box 456 then accesses the pixel data item of the random location from box 454.

The step in box 460 applies a sample set criterion that determines whether the random location's pixel data item is an edge pixel, which can be done by comparing its value with the values of neighboring pixels. If the pixel does not meet the criterion, another random location is obtained in box 454.

When a pixel is found that meets the sample set criterion, the step in box 462 measures distance across a connected component or between connected components to the nearest edge in the direction indicated in box 450. If the image has black characters on a white background, for example, distance across a connected component can be measured across black pixels to the nearest edge pixel, and distance between connected components can be measured across white pixels to the nearest edge pixel. The step in box 464 increments a value for a range of distances that includes the measured distance in a histogram data structure.

When the number of samples is obtained, the step in box 466 operates on the histogram data structure to obtain the size or spacing measure indicated in box 450. Detailed techniques for performing this step and other steps in FIG. 15 are described in copending, coassigned U.S. patent application Ser. No. 07/737,955, continued as application Ser. No. 08/077,702, entitled "Measuring Character and Stroke Sizes and Spacings for an Image," incorporated herein by reference.

The technique in FIG. 15 must somehow compensate for skew. One way to compensate for skew is to indicate a skew-compensated direction in box 450 so that the step in box 462 can use the same direction but relative to the skew in the image being analyzed.

5. Other Implementations

Figure 16:
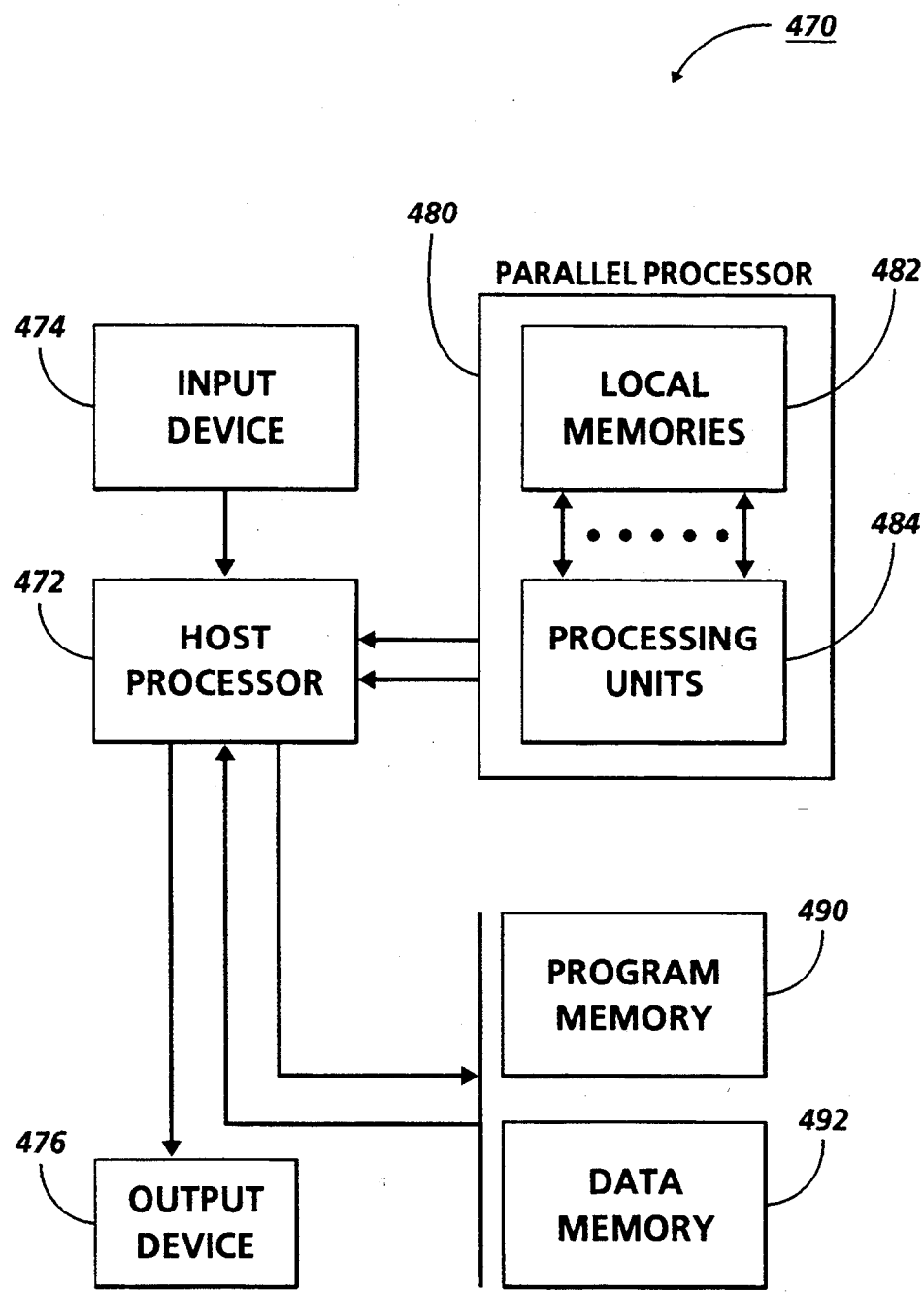
FIG. 16 is a schematic block diagram of a system that includes a parallel processor for measuring a characteristic of an image by random sampling.

The invention can alternatively be implemented on a parallel machine, as described above in relation to FIG. 5. FIG. 16 shows components of a parallel machine on which the invention could be implemented.

System 470 in FIG. 16 resembles system 160 in FIG. 7. System 470 includes host processor 472 connected to receive data from input device 474 and to provided data to output device 476. Host processor 472 is also connected to exchange data with parallel processor 480, which could, for example, be a Connection Machine from Thinking Machines Corporation. Parallel processor 480 includes processing units 482, each with local memory 484. Data defining an image can be stored in local memory 484 so that each pixel's value is stored in a respective processing unit's local memory. Host processor 472 executes instructions from program memory 490 and accesses data memory 492 in performing image processing, as described above in relation to FIG. 7. Host processor 472 executes subroutines that include operating each pixel's respective processing unit in parallel to obtain a randomly selected sample set of processing units, data from which can be combined to measure a characteristic for an image as a whole. Random sampling is advantageous even for the parallel implementation because it reduces the computation necessary to combine data from the processing units without introducing aliasing.

E. Applications

Figure 17:
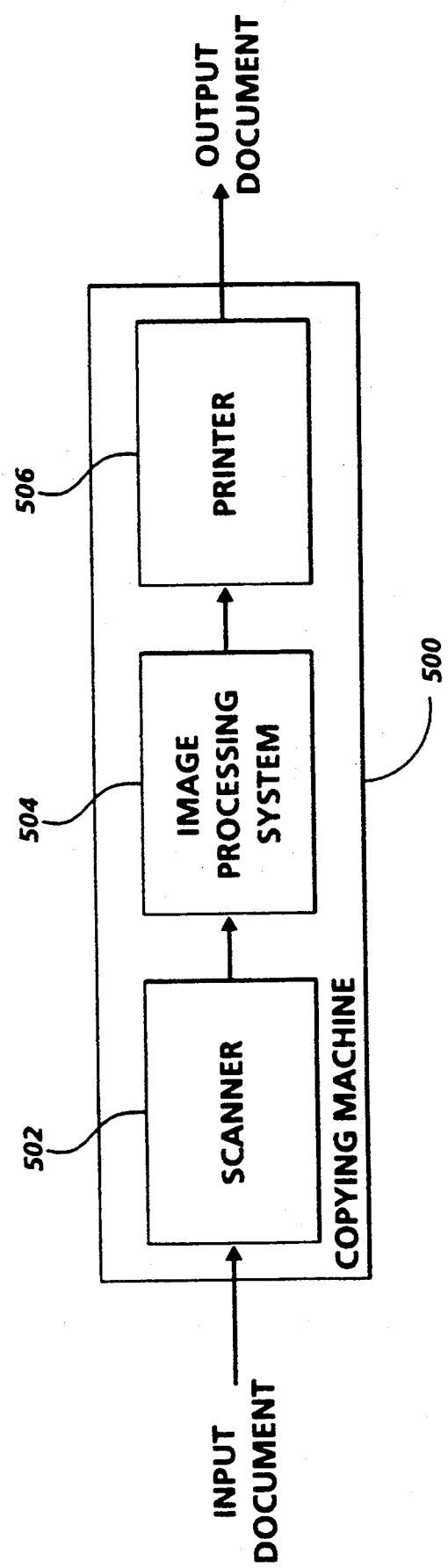
FIG. 17 is a schematic block diagram of a copying machine that includes an image processing system that measures a characteristic of an image by random sampling.

The invention could be applied in many ways, including skew detection, dominant typeface identification, and measurement of character and stroke sizes and spacings as described above. FIG. 17 illustrates a copying application.

Copying machine 500 includes scanner 502, image processing system 504, and printer 506. Scanner 502 can produce data defining an image of an input document. Image processing system 504 can be implemented as shown in FIG. 7 or in FIG. 16, and can, in addition to measuring skew, dominant typeface, and character size and spacing, use optical character recognition techniques to identify characters in the document. Image processing system 504 might also apply techniques to produce data defining a corrected image in which a character in the input document image is replaced by a correct version of the same character from the identified typeface at the appropriate size, position, and skew. The data defining the corrected image could then be provided to printer 506 to print an output document.

F. Miscellaneous

The invention has been described in relation to specific characteristics of text such as skew, dominant typeface, and character and stroke sizes and spacings. The invention might also be applicable to character or word identification. Further, the invention might also be applicable to non-text characteristics, such as skew of graphical features.

The invention has been described in relation to implementations in which operations are performed on data defining an image to measure a characteristic. The invention might also be implemented with specialized circuitry connected to photosensors for directly measuring an image characteristic.

The invention has been described in relation to software implementations, but the invention might be implemented with specialized hardware.

Although the invention has been described in relation to various implementations, roger, her with modifications, variations, and extensions thereof, other implementations, modifications, variations, and extensions are within the scope of the invention. The invention is therefore not limited by the description contained herein or by the drawings, but only by the claims.

What is claimed is:

1. An image processing method; the method operating on image data, the image data defining an image that includes a first number of locations, the image having an image characteristic relative to each of the locations; the method measuring the image characteristic for the image to a degree of statistical significance; the method comprising steps of:

for each of a second number of locations in the image, operating on the image data to obtain respective sample result data, each location's sample result data measuring the image characteristic relative to the location; each location's sample result data indicating a measurement in a direction extending from the location; the direction being the same for each location; each of the second number of locations being selected by:

randomly obtaining location data indicating one of the locations in the first number of locations; the location data being randomly obtained in a way that can obtain data indicating any of the first number of locations and that would, over a sufficiently large group of locations, indicate locations evenly distributed among the first number of locations; and applying a criterion to the image data to determine whether to select the location indicated by the location data as one of the second number of locations; and combining the respective sample result data of the second number of locations to obtain image result data for the direction; the second number being smaller than the first number but sufficient that the image result data measure the image characteristic for the image to the degree of statistical significance.

2. An image processing method; the method operating on image data, the image data defining an image that includes a first number of locations, the image having an image characteristic relative to each of the locations; the method measuring the image characteristic for the image to a degree of statistical significance; the method comprising steps of:

for each of a second number of locations in the image, each of which is randomly selected, operating on the image data to obtain respective sample result data, each location's sample result data measuring the image characteristic relative to the location; each location's sample result data including, for each of a set of two or more directions extending from the location, a respective data item; and combining the respective sample result data of the second number of locations to obtain image result data; the second number being smaller than the first number but sufficient that the image result data measure the image characteristic for the image to the degree of statistical significance; the step of combining the respective sample result data comprising a substep of combining, for each of the set of two or more directions, the respective data items to obtain a respective direction data item.

3. The method of claim 2 in which each of the respective data items in each location's sample result data indicates a distance, each direction data item being an average of distances indicated by the direction's respective data items.

4. An image processing method; the method operating on image data, the image data defining an image that includes a first number of locations, the image having an image characteristic relative to each of the locations; the method measuring the image characteristic for the image to a degree of statistical significance; the method comprising steps of:

for each of a second number of locations in the image, operating on the image data to obtain respective sample result data, each location's sample result data measuring the image characteristic relative to the location; each location's sample result data indicating a measurement in a direction extending from the location; the direction being the same for each location; the locations in the second number of locations being selected by:

for each location in the first number of locations, using the image data to obtain criterion data indicating whether the location meets a criterion; and using the criterion data to randomly obtain location data indicating locations in the second number of locations; the location data being randomly obtained in a way that can obtain data indicating any of the locations that are indicated to meet the criterion and that would, over a sufficiently large group of locations, indicate locations evenly distributed among locations that are indicated to meet the criterion; and combining the respective sample result data of the second number of locations to obtain image result data for the direction; the second number being smaller than the first number but sufficient that the image result data measure the image characteristic for the image to the degree of statistical significance.

5. The method of claim 1 in which each location is a pixel.

6. The method of claim 1 in which the substep of randomly obtaining location data includes a substep of randomly or pseudorandomly producing the location data.

7. The method of claim 1 in which the image data include, for each location in the image, a respective data item; the substep of applying a criterion to the image data includes a substep of accessing the location's data item.

8. The method of claim 7 in which each location's data item indicates whether the location has a first color or a second color, the substep of applying the criterion further comprising a substep of determining whether the location's data item indicates that the location has the first color.

9. The method of claim 8 in which each of the second number of locations has two or more neighboring locations in the image, the substep of applying the criterion further comprising substeps of:
accessing the respective data items of the location's neighboring locations; and
determining whether the respective data item of any of the neighboring locations indicates that the neighboring location has the second color so that the location is at an edge between the first color and the second color.

10. The method of claim 4 in which the image data include, for each location in the image, a respective data item; the method further comprising a step of operating a processor having a plurality of processing units, each with respective local memory, to store each location's data item in a respective processing unit's local memory; the substep of using the image data to obtain criterion data being performed by operating the respective processing units of all the locations in parallel so that each of the processing units operates on the data item stored in the respective local memory to produce criterion data indicating whether it is the respective processing unit of a location that meets the criterion; the substep of using the criterion data to randomly obtain location data comprising a substep of:
operating the processor to produce processing unit data indicating, for the second number of locations, the respective processing units; each of the second number of locations being a location whose respective processing unit produced criterion data indicating that the location meets the criterion.

11. The method of claim 4 in which the substep of using the criterion data to randomly obtain location data includes a substep of randomly or pseudorandomly producing candidate location data indicating candidate locations.

12. An image processing method; the method operating on image data, the image data defining an image that includes a number of locations, the image having an image characteristic relative to each of the locations; the method comprising:
two or more steps of obtaining sample result data, each step of obtaining sample result data comprising substeps of:
randomly or pseudorandomly producing respective location data indicating a respective location in the image; the location data being randomly or pseudorandomly obtained in a way that can obtain data indicating any of the locations in the image and that would, over a sufficiently large group of locations, indicate locations evenly distributed among the locations in the image; and
operating on the image data to obtain respective sample result data measuring the image characteristic relative to the respective location indicated by the respective location data; the sample result data indicating a measurement in a direction extending from the location; the direction being the same for each step of obtaining sample result data; and
a step of combining the respective sample result data of the respective locations to obtain combined result data for the direction.

13. An image processing method; the method operating on image data, the image data defining an image that includes a number of locations, the image having an image characteristic relative to each of the locations; the method comprising:
two or more steps of obtaining sample result data, each step of obtaining sample result data comprising substeps of:
randomly or pseudorandomly producing respective location data indicating a respective location in the image; and
operating on the image data to obtain respective sample result data measuring the image characteristic relative to the respective location indicated by the respective location data; each step's sample result data including, for each of a set of two or more directions extending from the respective location, a respective data item; and
a step of combining the respective sample result data of the respective locations to obtain combined result data; the step of combining the respective sample result data comprising a substep of combining, for each of the set of two or more directions, the respective data items to obtain a respective direction data item.

14. The method of claim 13 in which each of the respective data items in each location's sample result data indicates a distance, each direction data item indicating a distribution of distances indicated by the direction's respective data items.

15. The method of claim 12 in which each location is a pixel.

16. The method of claim 12 in which each step of obtaining sample result data further comprises a substep of applying a criterion to the image data to determine whether to obtain respective sample result data for the respective location indicated by the respective location data.

17. The method of claim 16 in which the image data include, for each location in the image, a respective data item; the substep of applying the criterion including a substep of accessing the respective location's data item.

18. The method of claim 17 in which each location's data item indicates whether the location has a first color or a second color, the substep of applying the criterion further comprising a substep of determining whether the respective location's data item indicates that the respective location has the first color.

19. The method of claim 18 in which each step's respective location has two or more neighboring locations in the image, the substep of applying the criterion further comprising substeps of:
accessing the respective data items of the respective location's neighboring locations; and determining whether the respective data item of any of the neighboring locations indicates that the neighboring location has the second color so that the respective location is at an edge between the first color and the second color.

20. An image processing method; the method operating on image data, the image data defining an image that includes a number of locations, the image having an image characteristic relative to each of the locations; the method comprising:

a step of operating on the image data to produce, for each of a set of two or more initial segments of the image, respective initial segment data defining the initial segment;

for each initial segment, two or more steps of obtaining sample result data, each step of obtaining sample result data comprising substeps of:

randomly or pseudorandomly producing respective location data indicating a respective location in the initial segment; and operating on the initial segment's initial segment data to obtain respective sample result data measuring the image characteristic relative to the respective location indicated by the respective location data; the respective sample result data indicating a measurement in a direction extending from the respective location; the direction being the same for each step of obtaining sample result data; and for each initial segment, a step of combining the respective sample result data of locations in the initial segment to obtain combined result data for the direction; and a step of using the combined result data of the initial segments to produce, for a group of the initial segments, grouped segment data defining a larger segment that includes the initial segments in the group.

21. The method of claim 20 in which the image data includes a respective data item for each of the locations in the image; each initial segment's initial segment data including a respective data item for each location in the initial segment.

22. The method of claim 20 in which each initial segment is a rectangle.

23. The method of claim 20 in which the image includes lines of text, each line of text including words, each initial segment including one of the words.

24. The method of claim 20 in which each of the initial segments includes a respective number of locations; the steps of obtaining sample data including a respective number of steps for each initial segment; each initial segment's number of steps being smaller than the respective number of locations but sufficient that the initial segment's combined result data measure the image characteristic for the initial segment to a degree of statistical significance.

25. The method of claim 20 in which each location is a pixel.

* * * * *